US005957652A

United States Patent [19]

Mimura et al.

[11] Patent Number: 5,957,652

[45] Date of Patent: Sep. 28, 1999

[54] SHEET HANDLING APPARATUS

[75] Inventors: Hideki Mimura; Kazuyuki Kubota; Takehiko Saito; Hirofumi Kaneko; Tsuyoshi Asahara; Kazuaki Sano, all of Yamanashi-ken, Japan

[73] Assignee: Nisca Corporation, Yamanashi-ken, Japan

[21] Appl. No.: 09/022,389

[22] Filed: Feb. 12, 1998

[30] Foreign Application Priority Data

| | | | |
|---|---|---|---|
| Feb. 13, 1997 | [JP] | Japan | 9-029091 |
| May 26, 1997 | [JP] | Japan | 9-153027 |

[51] Int. Cl.$^{6}$ .......... B65G 57/00; B65H 33/04; B65H 29/02; B65H 39/045

[52] U.S. Cl. .......... 414/790.04; 270/58.01

[58] Field of Search .......... 270/58.01, 58.07, 270/58.08, 58.09, 58.11, 58.12, 58.13; 271/218; 399/408; 414/790.02, 790.03, 790.04

[56] References Cited

U.S. PATENT DOCUMENTS 5,150,168 9/1992 Kamath et al. .......... 271/218 X

*Primary Examiner*—David H. Bollinger
*Assistant Examiner*—K W Bower
*Attorney, Agent, or Firm*—Sixbey, Friedman, Leedom & Ferguson, P.C.; Donald R. Studebaker

[57] ABSTRACT

A sheet handling apparatus receives a plurality of sheets discharged by a discharge roller pair from an image recording apparatus on a first support member disposed below the discharge roller pair to form a stack of the sheets on the first support member and carries out handling on the stack of sheets. A second support member is supported to be movable back and forth between a projecting position where it is projected over the first support member and is able to support a rear end portion of a sheet discharged by the discharge roller pair with a front end portion of the sheet supported by the first support member and a retracted position where it is retracted from the first support member. A controller controls movement of the second support member.

19 Claims, 18 Drawing Sheets

SHEET HANDLING APPARATUS

BACKGROUND OF THE INVENTION

1. Field of the Invention

This invention relates to a sheet handling apparatus which receives series of recording sheets discharged from an image recording apparatus such as a copier, a printer or the like on a handling tray in a stack and carries out handling on the stack of sheets, e.g., lining up the edges of the sheets.

2. Description of the Related Art

There has been known a sheet handling apparatus which, for instance, stacks a series of recording sheets discharged from a copier, a printer or the like on a handling tray, lines up the edges of the sheets and staples the sheets together.

If a recording sheet of the next series is fed on a stack of a series of recording sheets while the stack of sheets is handled, a desired handling cannot be carried out on the stack and there is fear that the recording sheet of the next series is carried out from the handling tray together with the stack of the recording sheets. On the other hand, when the sheet handling apparatus is arranged to receive recording sheets of the next series after handling of the recording sheets of the preceding series, the working efficiency of the sheet handling apparatus deteriorates.

Thus it has been proposed to provide a retractable auxiliary tray between the handling tray and a discharge roller of the image recording apparatus and to separate recording sheets of the next series from the stack of recording sheets of the preceding series on the handling tray by temporarily supporting the recording sheets of the next series on the auxiliary tray until handling of the recording sheets of the preceding series is completed. See, for instance, Japanese Unexamined Patent Publication Nos. 63(1988)-154578 and 63(1988)-180673.

It is desirable that such an auxiliary tray be as small as possible from the viewpoint of reducing the size of the overall apparatus. However when the auxiliary tray is small, it becomes difficult to surely support the recording sheets. Accordingly the auxiliary tray disclosed in the above identified Japanese patent publications comprises a stationary part and a movable part and only the movable part is projected to support the recording sheet together with the stationary part. Accordingly the structure of the auxiliary tray is complicated and the overall size of the auxiliary tray is large, which is not desirable from the viewpoint of reducing the size of the overall apparatus.

By the way, since a plurality of recording sheets are stacked on the handling tray and it is very difficult to move up and down the handling tray due to the limited space in the apparatus, the handling tray must be positioned below the discharge port, through which the recording sheet is discharged to the handling tray, at a substantial distance therefrom, which gives rise to the following problem. That is, if a recording sheet is discharged from the discharge port directly onto the handling tray, the leading edge of the recording sheet is hung down from the discharge port and abuts against the upper surface of the handling tray or the surface of the recording sheet thereon, which can cause the recording sheet to be buckled or turned over. Such problems is more apt to arise when there is no recording sheet on the handling tray due to a recess and/or a slot formed on the handling tray for permitting movement of various member for handling the sheets. A buckled recording sheet is apt to cause jamming.

SUMMARY OF THE INVENTION

In view of the foregoing observations and description, the primary object of the present invention is to provide a sheet handling apparatus in which recording sheets discharged from an image recording apparatus can be surely supported by an auxiliary tray which is small in size.

Another object of the present invention is to provide a sheet handling apparatus in which recording sheets discharged from an image recording apparatus can be prevented from buckling.

In accordance with the present invention, there is provided a sheet handling apparatus which receives a plurality of sheets discharged by a discharge means from an image recording apparatus on a first support member (a handling tray) disposed below the discharge means to form a stack of the sheets on the first support member and carries out handling on the stack of sheets, wherein the improvement comprises a second support member (an auxiliary tray) which is supported to be movable back and forth between a projecting position where it is projected over the first support member and is able to support a rear end portion of a sheet discharged by the discharge means with a front end portion of the sheet supported by the first support member and a retracted position where it is retracted from the first support member, and a control means which controls movement of the second support member.

It is preferred that the second support member be moved back and forth between the projecting position and the retracted position in a direction parallel to the sheet receiving surface of the first support member.

Preferably the second support member is provided with a sheet returning means for conveying the sheet discharged onto the second support member in a direction opposite to the direction of discharge by the discharge means.

That is, the sheet is apt to overshoot a predetermined position on the second support member under momentum acting thereon when the sheet is discharged by the discharge means. In the case of a second support member which is large in the dimension as measured in the direction of discharge of the recording sheets by said discharge means, the sheet can be returned to the predetermined position by inclining the upper surface of the second support member. However in the case of a second support member which is small in the dimension as measured in the direction of discharge of the sheets by said discharge means, the leading edge portion of the sheet can overshoot the leading edge of the second support member to hang therefrom and in such a case, the sheet cannot be returned to the predetermined position solely by inclination of the second support member. When a preceding sheet is held in such a position, the leading end of the following sheet can push the preceding sheet to fall it onto the first support member. Accordingly it is preferred that the second support member be provided with such a sheet returning means.

Preferably, the discharge means comprises a rotating member such as a roller disposed to be brought into contact with the sheet on the second support member and the rotating member doubles as the sheet returning means from the viewpoint of simplification of the structure of the apparatus.

For example, the control means may move the second support member to the projecting position before initiation of receipt of a plurality of sheets and return the second support member after at least a part of the sheet which is discharged earliest in the sheets comes to be supported by the second support member.

With this arrangement, buckling of the sheet which is discharged directly onto the first support member can be prevented.

Further the control means may move the second support member to the projecting position after a series of sheets to be handled together are received by the first support member and before a following sheet is received by the first support member so that the following sheet is supported by the second support member.

With this arrangement, a series of sheets to be handled together can be separated from another series of sheets.

The control means may move the second support member back and forth between the projecting position and the retracted position each time a predetermined number of sheets are discharged in such a manner that the second support member is moved to the projecting position before at least a part of the sheet which is discharged earliest in the predetermined number of sheets is brought into contact with the upper surface of the first support member or the preceding sheet on the handling tray and is returned to the retracted position after at least a part of the sheet which is discharged earliest in the predetermined number of sheets comes to be supported by the second support member to permit the sheet on the second support member to move to the first support member.

With this arrangement, buckling of the sheet discharged earliest can be prevented.

Further the control means may move the second support member back and forth between the projecting position and the retracted position each time a predetermined number of sheets are discharged in such a manner that the second support member is moved to the projecting position before at least a part of the sheet which is discharged earliest in the predetermined number of sheets is brought into contact with the upper surface of the first support member or the preceding sheet on the handling tray and is returned to the retracted position after at least a part of the sheet which is discharged last in the predetermined number of sheets comes to be supported by the second support member to permit the sheet on the second support member to move to the first support member.

With this arrangement, buckling of the sheets can be prevented by falling the sheets onto the first support member by once supporting them on the second support member by a predetermined number.

Further the control means may move the second support member to the projecting position after a sheet stack on the first support member is removed from the first support member.

The sheet handling apparatus in accordance with the present invention may be provided with a post handling means for post handling of a sheet stack on the first support member, a third support member on which sheet stacks handled by the post handling means are stacked and a transfer means which transfers each sheet stack handled by the post handling means to the third support member.

In this case, it is preferred that the second support member in the projecting position is above the transfer path of the sheet stack by the transfer means.

Further, in this case, the control means may move the second support member to the projecting position after a series of sheets which are to be handled together are all received by the first support member and before a following sheet is received by the first support member so that the following sheet is supported on the second support member, and return the second support member to the retracted position to permit the sheet on the second support member to fall on the first support member after transfer of said series of sheets from the first support member is initiated.

With this arrangement, a series of sheets to be handled together can be surely separated from another series of sheets.

In accordance with another aspect of the present invention, there is provided a sheet handling apparatus which receives a plurality of sheets discharged by a discharge means from an image recording apparatus on a first support member disposed below the discharge means to form a stack of the sheets on the first support member and carries out handling on the stack of sheets, wherein the improvement comprises a second support member which is supported to be movable back and forth between a projecting position where it is projected over the first support member and is able to support a rear end portion of a sheet discharged by the discharge means with a front end portion of the sheet supported by the first support member and a retracted position where it is retracted from the first support member, a sheet sensor which detects a sheet discharged by the discharge means, and a control means which controls movement of the second support member on the basis of result of detection of the sheet by the sheet sensor.

In this arrangement, the control means may move the second support member to the projecting position before a first predetermined time lapses after the sheet sensor detects the sheet which is discharged earliest in a predetermined number of sheets.

In this case, the control means may move the second support member to the retracted position after a second predetermined time lapses from the time the sheet sensor detects the sheet which is discharged earliest in the predetermined number of sheets.

Otherwise the control means may move the second support member to the projecting position before initiation of receipt of a predetermined number of sheets and may move the second support member to the retracted position after a predetermined time lapses from the time the sheet sensor detects the sheet which is discharged earliest in the predetermined number of sheets.

The control means may change the timing at which it moves the second support member to the retracted position according to the size of the sheet on the basis of sheet size information output from the image recording means.

In this case, generally the control means moves the second support member to the retracted position earlier as the dimension of the sheet to be discharged as measured in the direction of discharge of the sheets by said discharge means increases.

Further in the present invention, the second support member may be smaller than the first support member in the dimension as measured in the direction of discharge of the sheets by said discharge means so that in the projecting position, the second support member supports the sheet by itself when the dimension of the sheet as measured in the direction of discharge of the sheets by said discharge means is relatively small and supports the sheet associating with at least a part of the first support member when the dimension of the sheet as measured in the direction of discharge of the sheets by said discharge means is relatively large.

DESCRIPTION OF THE PREFERRED EMBODIMENT

A sheet handling apparatus in accordance with an embodiment of the present invention will be described with reference to FIGS. 1 to 12, hereinbelow. The sheet handling apparatus of this embodiment performs, as a post handling, stapling on a plurality of recording sheets discharged from a copier.

Figure 1:
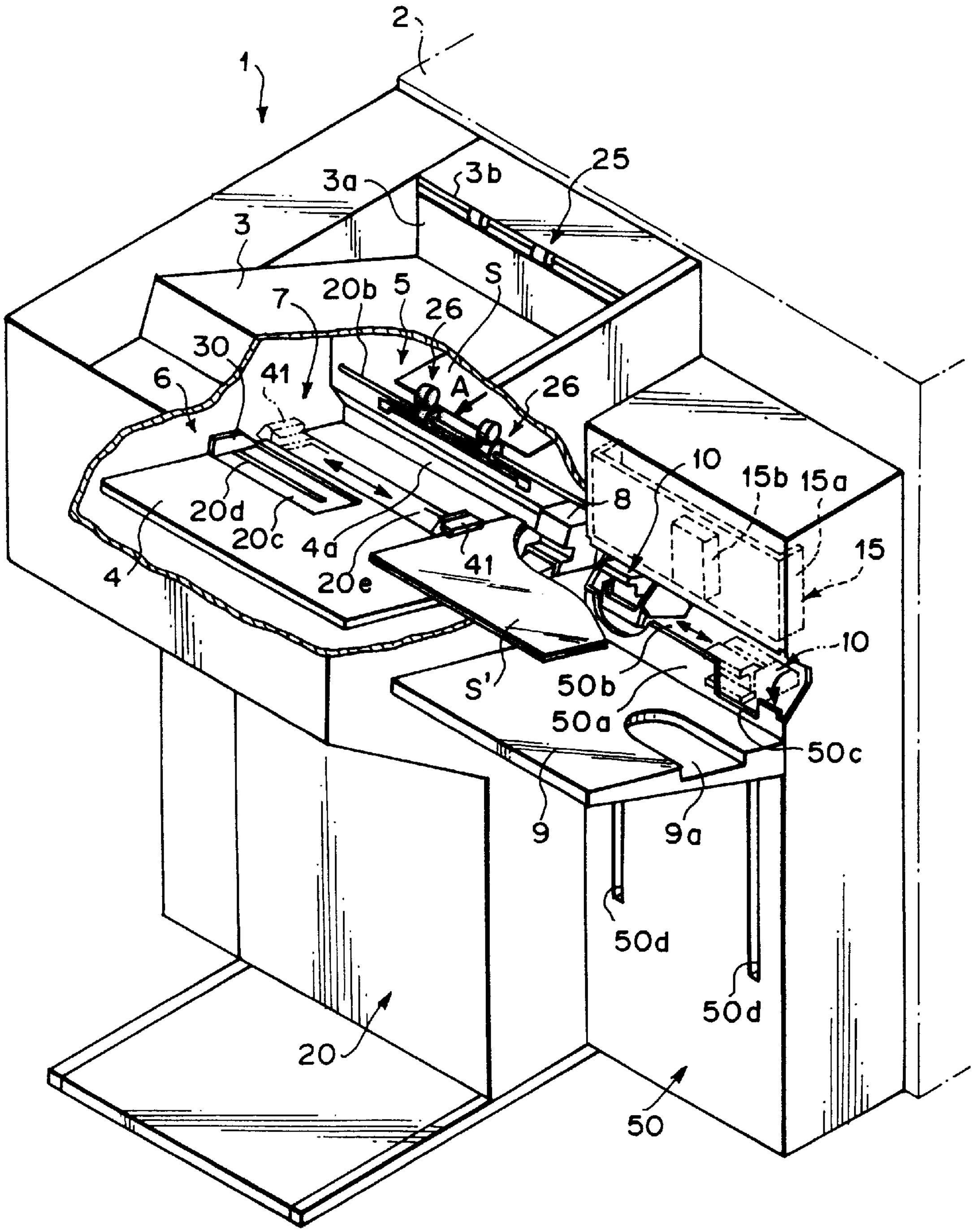
FIG. 1 is a perspective view partly cut away showing a sheet handling system provided with a sheet handling apparatus in accordance with an embodiment of the present invention.

In FIG. 1, reference numeral 1 denotes a sheet handling system including a copier 2, the sheet handling apparatus 20 of this embodiment and an accumulation handling apparatus 50. The copier 2, the sheet handling apparatus 20 and the accumulation handling apparatus 50 are housed in separate housings.

The sheet handling apparatus 20 comprises a transfer means 5 which transfers recording sheets S discharged from the copier 2 in sequence to a first accumulation tray 3 when the recording sheets 3 need not be post-handled and to a handling tray 4 when the recording sheets 3 are to be post-handled, a lineup means 6 which lines up the edges of the recording sheets S stacked on the handling tray 4, a first gripper 7 which grips the lined sheet stack S' and transfers the same, a stapler 8 which staples the sheet stack S' held by the first gripper 7, and an auxiliary tray 13 which is disposed above the handling tray 4 and below the transfer means 5.

The housing of the sheet handling apparatus 20 has a slot 20*b* through which the recording sheets S are discharged and the handling tray 4 is disposed below the slot 20*b*. The handling tray 4 is provided with a recess 20*c* and a slot 20*d* formed in the bottom of the recess 20*c* which are for permitting movement of a lineup member 30 of the lineup means 6 as will be described later. The handling tray 4 is further provided with a slot 20*e* for permitting movement of the first gripper 7. The housing of the sheet handling apparatus 20 has a slot 20*f* (FIG. 3) through which the stapled sheet stack S' is transferred to a second accumulation tray 9 in the accumulation handling apparatus 50 by the first gripper 7.

Figure 3:
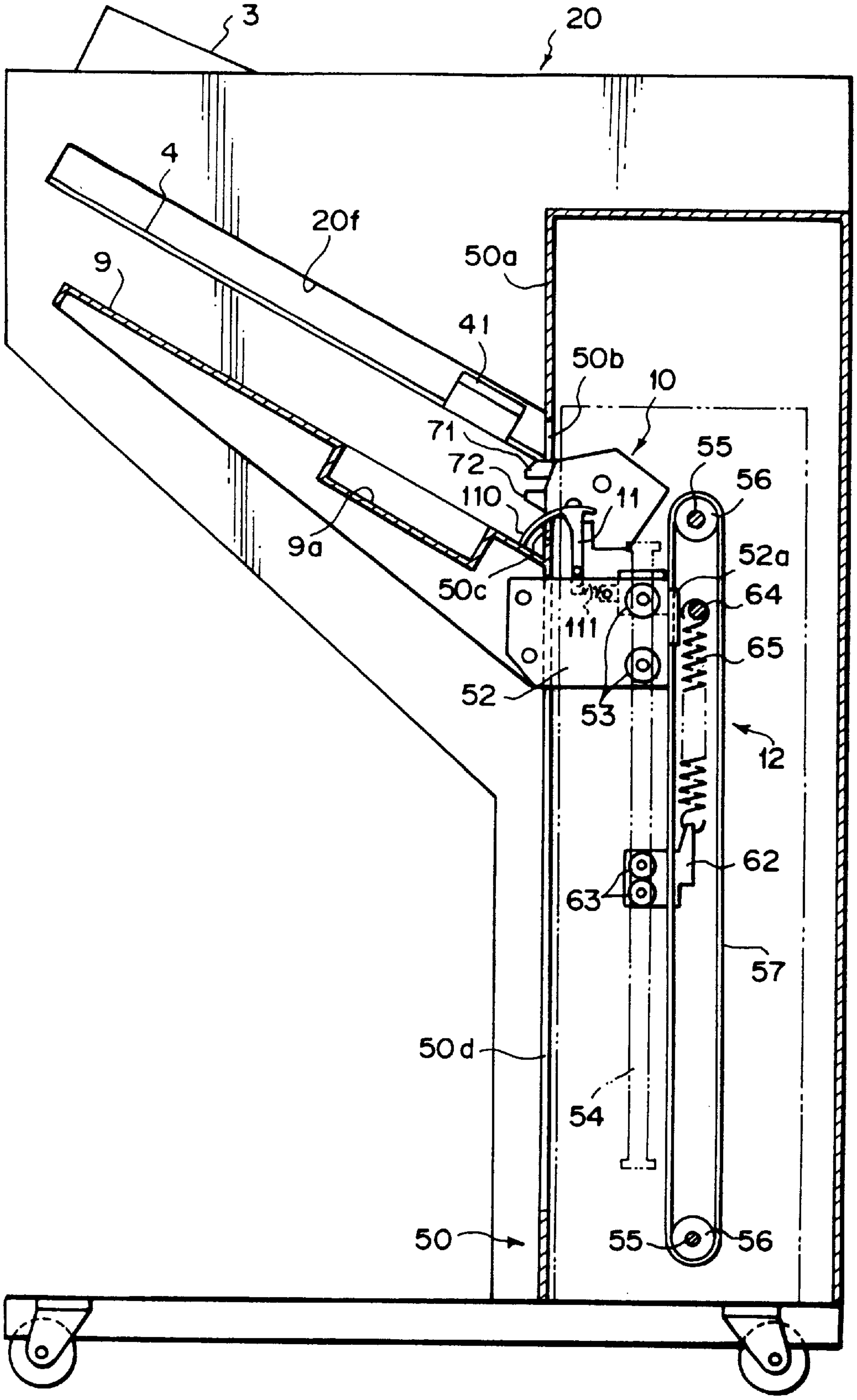
FIG. 3 is a cross-sectional view showing the accumulation handling apparatus employed in the system shown in FIG. 1.

As shown in FIG. 3, the slot 20*f* is parallel to both the handling tray 4 and the second accumulation tray 9. Accordingly the sheet stack S' is transferred from the handling tray 4 to the second accumulation tray 9 in translation operation, whereby the sheet stacks S' stacked on the second accumulation tray 9 are kept well lined up.

The accumulation handling apparatus 50 comprises the second accumulation tray 9 which is movable up and down and on which the stapled sheet stacks S' are stacked, a second gripper 10 which receives the stapled sheet stack S' from the first gripper 7 and transfers the sheet stack S' to a predetermined position on the second accumulation tray 9, a sheet level detecting means 11 which detects the level of the sheet stacks S' stacked on the second accumulation tray 9, a lift means 12 which moves up and down the second accumulation tray 9, and a shutter 15 which is moved up and down in response to up and down movement of the second accumulation tray 9.

The housing of the accumulation handling apparatus 50 is provided with a vertical wall 50*a* against which one side of the sheet stack S' transferred to the second accumulation tray 9 is brought into abutment in order to locate and line up the sheet stacks S', a horizontal slot 50*b* for permitting horizontal movement of the second gripper 10, a vertical recess 50*c* which is communicated with the horizontal slot 50*b* and permits rotation of the second gripper 10 in a vertical direction, and a pair of guide grooves 50*d* which extend in a vertical direction to permit up and down movement of the second accumulation tray 9.

The first accumulation tray 3 is formed integrally with the top surface of the housing of the sheet handling apparatus 20 and is inclined upward from the upstream side to the downstream side with respect to the direction in which the recording sheet S is discharged to the first accumulation tray 3. A vertical wall 3*a* is erected at the upstream end of the first accumulation tray 3 and a slot 3*b* through which the recording sheet S is discharged to the first accumulation tray 3 is formed in an upper portion of the vertical wall 3*a*.

Figure 2:
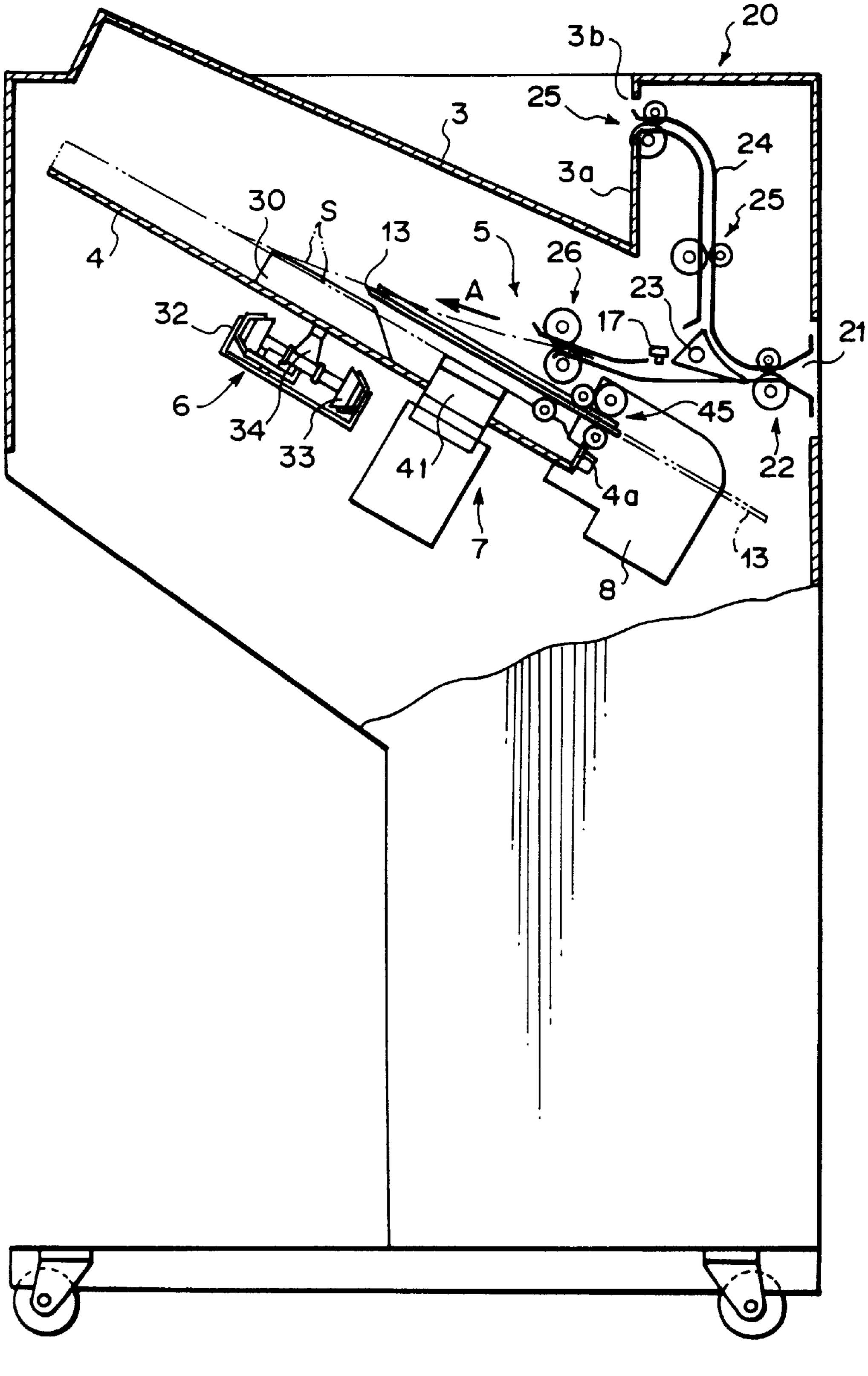
FIG. 2 is a side view partly cut away showing the sheet handling apparatus.

As shown in FIG. 2, the transfer means 5 has an inlet slot 21 open in the back side of the housing of the sheet handling apparatus 20. The inlet slot 21 is in alignment with a sheet discharge slot (not shown) of the copier 2 and receives the recording sheet S discharged from the copier 2. A conveyor roller pair 21 and a flapper 23 for switching the sheet transfer path between a first transfer path leading to the first accumulation tray 3 and a second transfer path leading to the handling tray 4 are disposed downstream the inlet slot in this order from the upstream side. The first transfer path is formed by guide plates 24 and two conveyor roller pairs 25, and the second transfer path is formed by guide plates 24 and a discharge roller pair 26.

The handling tray 4 is disposed below the first accumulation tray 3 and is inclined in parallel to the first accumulation tray 3. A series of recording sheets S to be stapled together are conveyed in sequence to the handling tray 4 in a direction of arrow A by the discharge roller pair 26 disposed at the end of the second transfer path which is substantially linear. The handling tray 4 has an erected wall surface 4*a* at the upstream side end thereof. The erected wall surface 4*a* extends in perpendicular to the direction A of discharge of the recording sheet S and functions as a reference surface for lining up the rear edges of the recording sheets S as will be described below.

The lineup means 6 lines up the recording sheets S in a sheet stack S' (FIG. 4) stacked on the handling tray 4 by bringing the rear edges of the recording sheets S into abutment against the reference surface 4*a* of the handling tray 4 and bringing one side edges of the recording sheets S into abutment against a surface of a reference plate 31, which is in the form of a shutter and movable up and down, by the lineup member 30 which pushes the other side edges of the recording sheets S toward the reference plate 31.

A mechanism for moving the lineup member 30 will be described with reference to FIG. 5, hereinbelow. A pair of rails 32 extend in the direction of width of the handling tray 4 therebelow. A holding member 34 which holds the lineup member 30 is engaged with the rails 32 to be movable along the rails 32 by way of conical rollers 33 on opposite sides thereof. An endless belt 36 is passed around a pair of pulleys 35 and is fixed to the holding member 34. One of the pulleys 35 is driven by a lineup motor 37 (FIG. 15) to move the holding member 34 and the lineup member 30 held thereon along the rails 32 by way of the belt 36.

The lineup member 30 is held in a retracted position away from the recording sheets S while the recording sheets S are transferred to the handling tray 4 in sequence. After a predetermined number of recording sheets S are stacked on the handling tray 4, the lineup member 30 is moved toward the sheet stack S' to bring the side edges of the sheets S into abutment against the surface of the reference plate 31, thereby lining up the edges of the recording sheets S.

Figure 12:
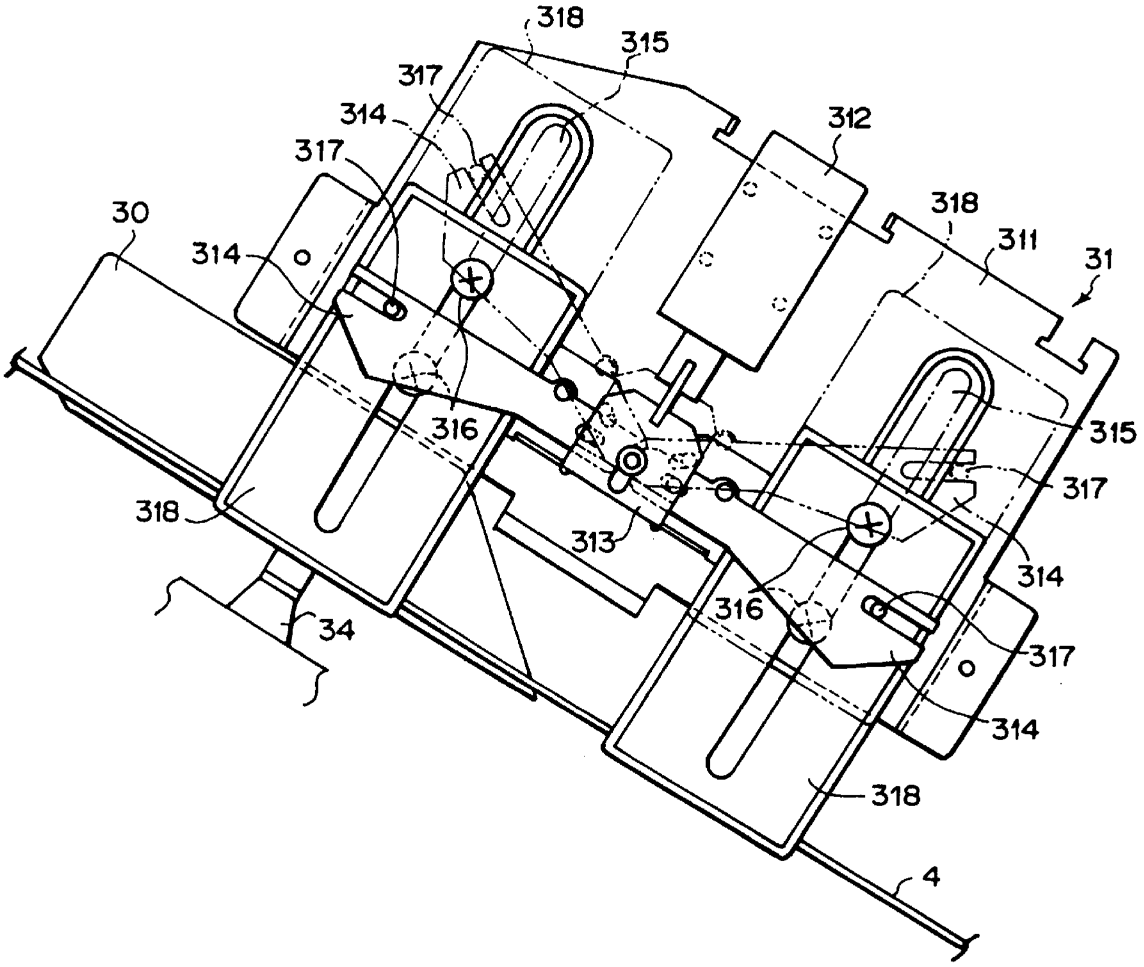
FIG. 12 is an enlarged front view of the reference plate.

As shown in FIG. 12, the reference plate 31 comprises a stationary plate 311 fixed to the inner surface of the housing of the sheet handling apparatus 20, a shutter solenoid 312 held by the stationary plate 311, a connecting plate 313 which is provided on the leading end portion of the shutter solenoid 312, a pair of levers 314 connected to the connecting plate 313 at their one ends, and a pair of shutter plates 318 which are connected to the other ends of the levers 314 by way of connecting pins 317 received in slots formed in the other end portions of the levers 314. A pin 316 fixed to each of the shutter plate 318 is in engagement with a guide slot 315 formed in the stationary plate 311, and by virtue of the pins 316 and 317 and the guide slots 315, a rotary motion of the arms 314 is converted into a liner motion of the shutter plates 318. When another recording sheet S which forms another sheet stack S' is discharged to the handling tray 4 while a sheet stack S' is in the course of transfer to the second accumulation tray 9, the shutter solenoid 312 rotates the levers 314 so that the shutter plates 318 are brought into contact with the upper surface of the sheet stack S' in the course of transfer, thereby enabling lineup of said another recording sheet S.

Figure 6:
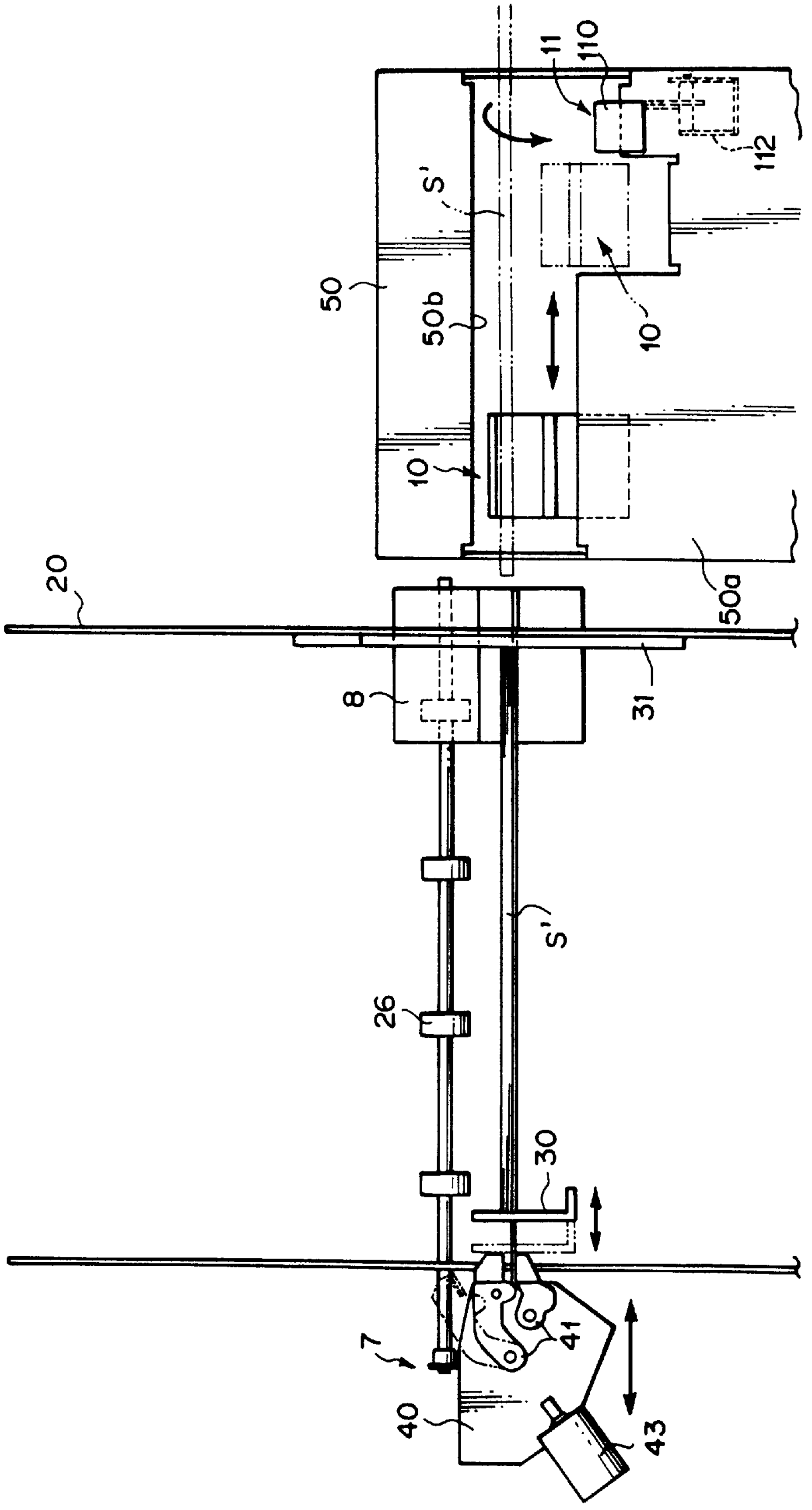
FIG. 6 is a schematic front view showing the sheet handling apparatus and the accumulation handling apparatus.
Figure 15:
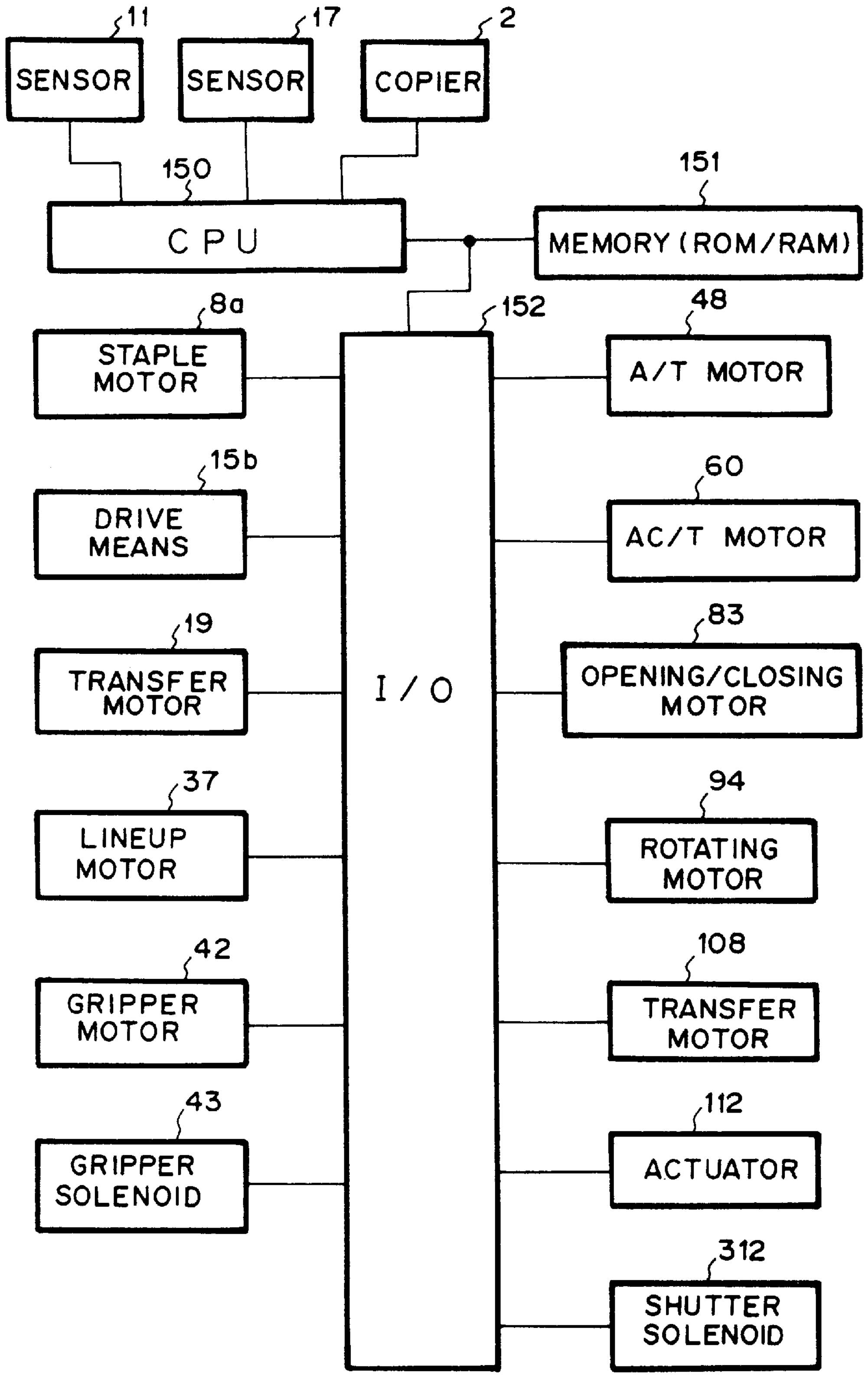
FIG. 15 is a block diagram showing the control system of the sheet handling system.

The first gripper 7 grips one side edge portion of the sheet stack S' which has been lined up on the handling tray 4 and transfers the sheet stack S' in the direction of arrow B which is perpendicular to the direction of discharge of the recording sheets S (arrow A). As shown in FIG. 6, the first gripper 7 comprises upper and lower pinch levers 41 which are supported on a movable frame 40 to be opened and closed. Though not shown in detail, the pinch levers 41 are closed to pinch or grip the side edge portion of the sheet stack S" by a gripper solenoid 43. The pinch levers 41 are moved back and forth by a gripper motor 42 (FIG. 15).

Figure 9:
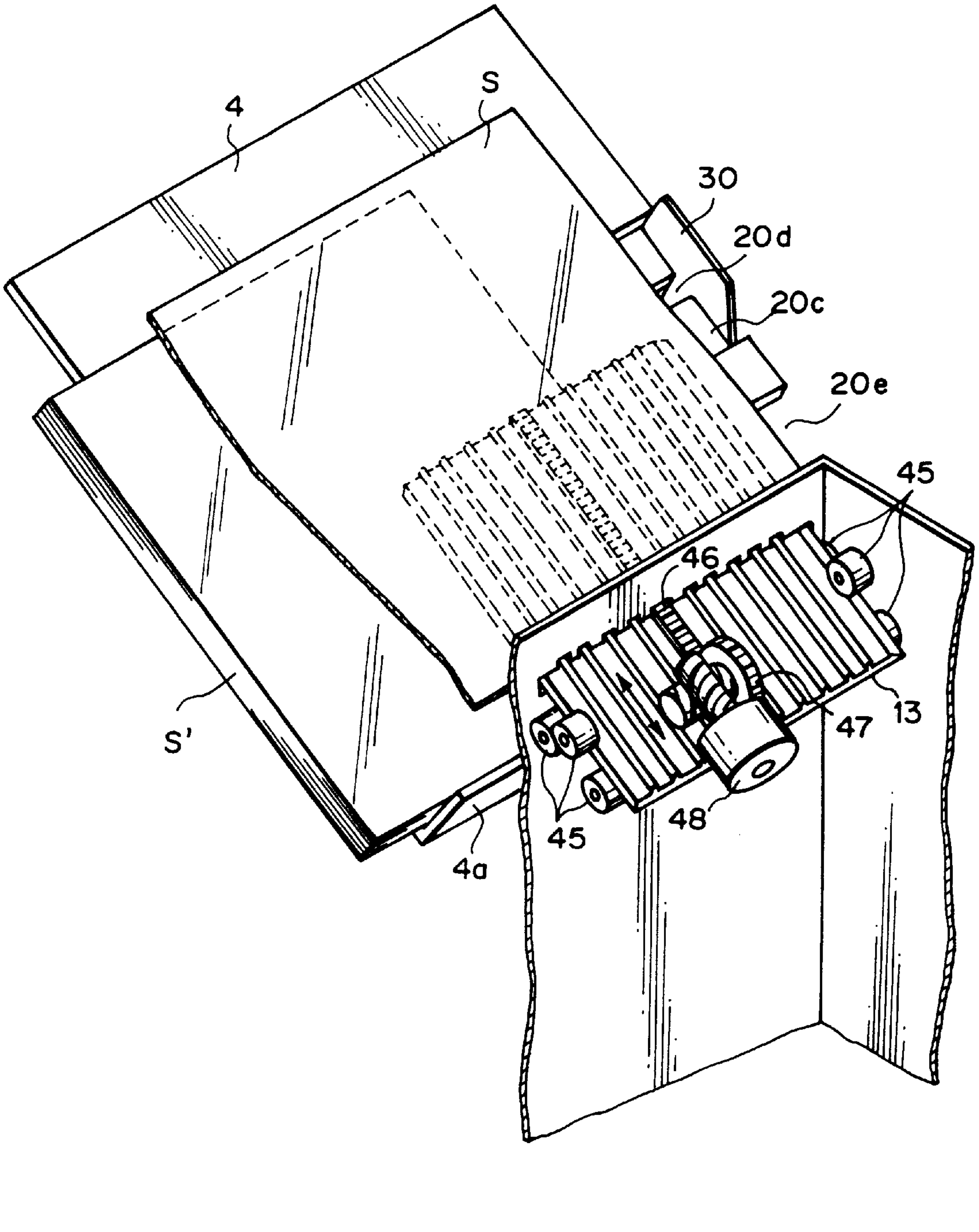
FIG. 9 is a perspective view of the auxiliary tray.

AS shown in FIGS. 2 and 9, the auxiliary tray 13 is in the form of a flat plate and is disposed between the discharge roller pair 26 and the handling tray 4. The auxiliary tray 13 is smaller than the handling tray 4 in the dimension as measured in the direction of discharge of the recording sheets S, and in this particular embodiment, the former is smaller than the latter both in length and width. The auxiliary tray 13 is supported on the upstream side of the handling tray 4 to be movable back and forth between a projecting position where it is projected over the handling tray 4 and a retracted position where it is retracted from the handling tray 4. That is, each side edge portion of the auxiliary tray 13 is supported by upper and lower guide rollers 45 to movable back and forth. A rack 46 is provided on a central portion of the auxiliary tray 13 and a pinion 47 is in mesh with the rack 46, which is driven by an auxiliary tray motor 48. The auxiliary tray 13 in the projected position is shown by the solid line in FIG. 2.

The auxiliary tray 13 is for separating a series of recording sheets S to be handled together from another series of recording sheets S and for preventing buckling of the recording sheets S when they are discharged onto the handling tray 4 as will be described in detail, hereinbelow. That is, when the sheet handling apparatus 1 is interrupted while a preceding series of recording sheets are handled, the working efficiency of the system deteriorates. In order to avoid this, the auxiliary tray 13 temporarily supports one or more following recording sheets S. For this purpose, basically the auxiliary tray 13 may be moved to the projecting position after the preceding series of recording sheets S are received by the handling tray 4 and before the following recording sheet S is received by the handling tray 4, and may be returned to the retracted position after transfer of the preceding series of recording sheets S from the handling tray 4 is begun. For example, when the sheet stack S' of the preceding series of recording sheets S is in the course of transfer to the second accumulation tray 9, the auxiliary tray 13 is returned to the retracted position substantially simultaneously with completion of transfer to the second accumulation tray 9, thereby dropping the recording sheet(s) S onto the handling tray 4. By the way, since a plurality of recording sheets S are stacked on the handling tray 4, the handling tray 4 must be positioned below the discharge roller pair 26 at a substantial distance therefrom, which gives rise to the following problem. That is, if a recording sheet S is discharged from the discharge roller pair 26 directly onto the handling tray 4, the leading edge of the recording sheet S is hung down from the discharge roller pair 26 and abuts against the upper surface of the handling tray 4 or the surface of the recording sheet S thereon, which can cause the recording sheet S to be buckled or turned over. Such problems is more apt to arise when there is no recording sheet S on the handling tray 4 due to the recess 20*c* and the slots 20*d* and 20*e* formed on the handling tray 4. In order to avoid such problems, the auxiliary tray 13 is projected to temporarily support the recording sheet S so that the recording sheet S spreads flat. For this purpose, basically the auxiliary tray 13 may be moved to the projecting position each time a recording sheet S is discharged at least before the leading edge of the recording sheet S is brought into contact with the upper surface of the handling tray 4 or the surface of the preceding recording sheet on the handling tray 4 and may be returned to the retracted position after at least a part of the recording sheet S comes to rest on the auxiliary tray 13. The auxiliary tray 13 may be moved to the projecting position and returned to the retracted position each time a predetermined number of recording sheets S are discharged. In this case, the auxiliary tray 13 is moved to the projecting position at least before the leading edge of the recording sheet S which is discharged earliest in the predetermined number of recording sheets is brought into contact with the upper surface of the handling tray 4 or the preceding recording sheet on the handling tray 4 and is returned to the retracted position after at least a part of the recording sheet S which is discharged last in the predetermined number of recording sheets S comes to rest on the auxiliary tray 13.

The timing at which the auxiliary tray 13 is retracted and projected is controlled according to detection by a sheet sensor 17 which is disposed upstream of the discharge roller pair 26 and detects that the leading end of the recording sheet S discharged by the discharge roller pair 26 reaches the upper surface of the handling tray 4 or the surface of a recording sheet S on the handling tray 4.

A series of recording sheets S to be handled together can sometimes include those which differ from each other in dimension in the direction of discharge. In such a case, the auxiliary tray retracting timing by the auxiliary tray motor 48 may be advanced as the dimension in the direction of transfer of the recording sheet S is increased on the basis of sheet size information output from the copier 2 and detection of the sheet by the sheet sensor 17, whereby buckling prevention can be effected according to the dimension of the recording sheet in the direction of transfer thereof. Even if the dimension of the recording sheets in the direction of transfer is uniform, the retracting timing may be advanced as the dimension of the recording sheet in the direction of transfer becomes larger than a standard dimension, e.g., the length of A4 size.

FIG. 9 shows a state where a recording sheet which is relatively large in the direction of transfer is supported on the auxiliary tray 13. In this case, the leading end portion of the recording sheet S hangs from the auxiliary tray 13 toward the handling tray 4 and is supported by a part of the handling tray 4. A recording sheet S which is small in the direction of transfer can be supported solely by the auxiliary tray 13.

Figure 10:
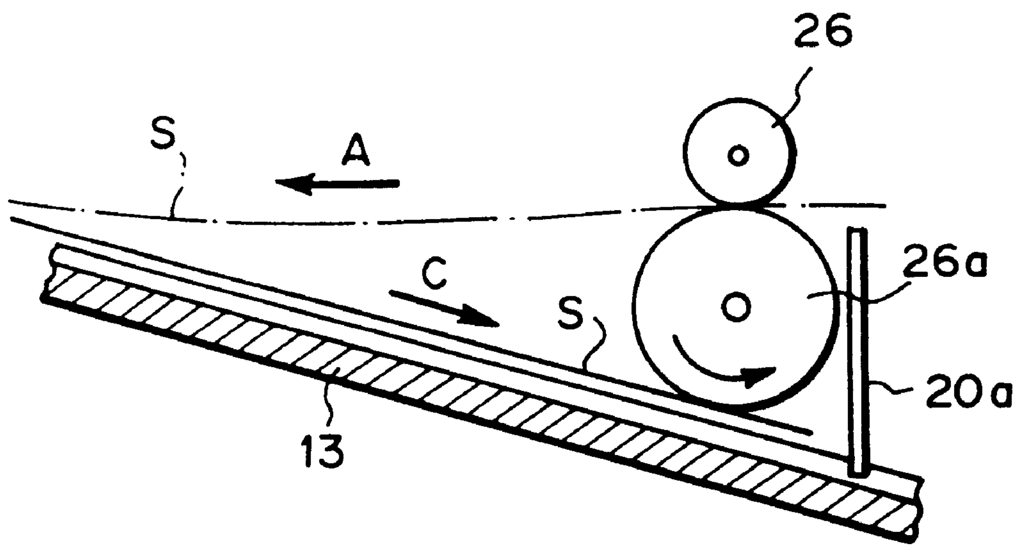
FIG. 10 is a side view of an example of the sheet returning mechanism.

As shown in FIG. 10, the auxiliary tray 13 is provided with a sheet returning mechanism for conveying the recording sheet S discharged onto the auxiliary tray 13 in a direction of arrow C opposite to the direction of discharge. The sheet returning mechanism is for returning the recording sheet S in place which is apt to overshoot a predetermined position on the auxiliary tray 13 under momentum acting thereon when the recording sheet S is discharged by the discharge roller pair 26. The sheet returning mechanism shown in FIG. 10 utilizes the lower roller **26*a* of the discharge roller pair 26. The lower roller 26*a* is larger in diameter than the other and is made of a soft material. The lower roller 26 is positioned so that its outer surface is in contact light with the recording sheet S on the auxiliary tray 13 to convey the recording sheet S to bring the trailing end thereof into abutment against a stopper plate 20*a***.

Since only one or two recording sheets S are placed on the auxiliary tray 13, the sheet returning mechanism need not be provided with a mechanism for attending to change in thickness of the sheet stack.

Figure 11:
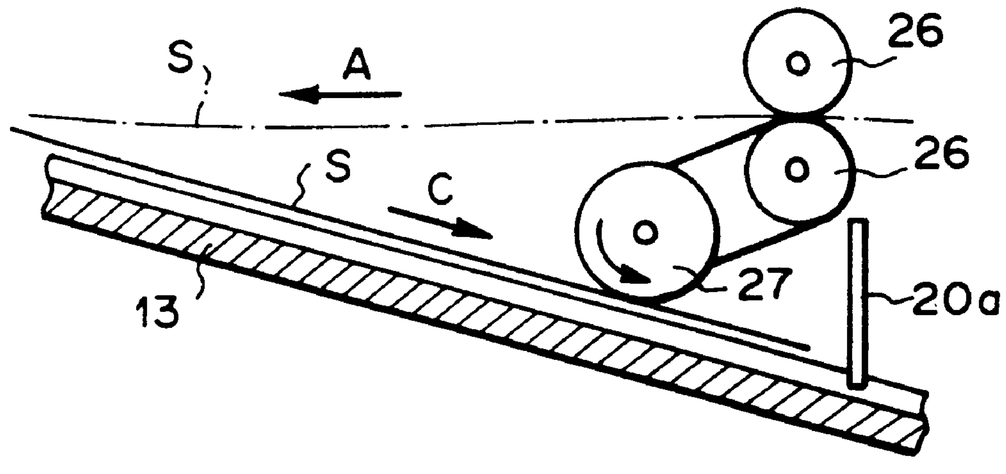
FIG. 11 is a side view of another example of the sheet returning mechanism.

FIG. 11 shows a modification of the sheet returning mechanism. In the modification shown in FIG. 11, the discharge roller pair 26 is positioned above the auxiliary tray 13 and a return roller 27 is positioned so that its outer surface is in contact light with the recording sheet S on the auxiliary tray 13. The return roller 27 is driven by the lower roller 26 by way of a belt to convey the recording sheet S to bring the trailing end thereof into abutment against the stopper plate **20*a***.

The stapler 8 is for binding the sheet stack S' with a staple near an edge of the sheet stack S'. The stapler 8 is disposed beside the erected wall surface **4*a* on the side of the second accumulation tray 9**.

Stapling by the stapler 8 is effected transferring the sheet stack S' by the first and second grippers 7 and 10. That is, when the sheet stack S' is to be stapled in one position, the first gripper 7 stops the sheet stack S' with a desired position of the sheet stack S' opposed to the stapler 8 and then the stapler 8 is operated. When the sheet stack S' is to be stapled in two positions, the first gripper 7 stops the sheet stack S' with a first position of the sheet stack S' opposed to the stapler 8 and then the stapler 8 is operated, and-thereafter the first gripper 7 transfers the sheet stack S' to the second gripper 10 and the second gripper 10 stops the sheet stack S' with a second position of the sheet stack S' opposed to the stapler 8 and the stapler 8 is operated. The stapler 8 may be arranged to be movable along the direction A of discharge so that the stapling position can be changed according to the size of the staples.

The second accumulation tray 9 is disposed in parallel to the handling tray 4 shifted forward relative to the handling tray 4 in a direction perpendicular to the direction of discharge (the direction of arrow A). A recess **9*a* for facilitating taking out the sheet stacks S' on the second accumulation tray 9 is formed in a side edge portion of the second accumulation tray 9**.

Figure 5:
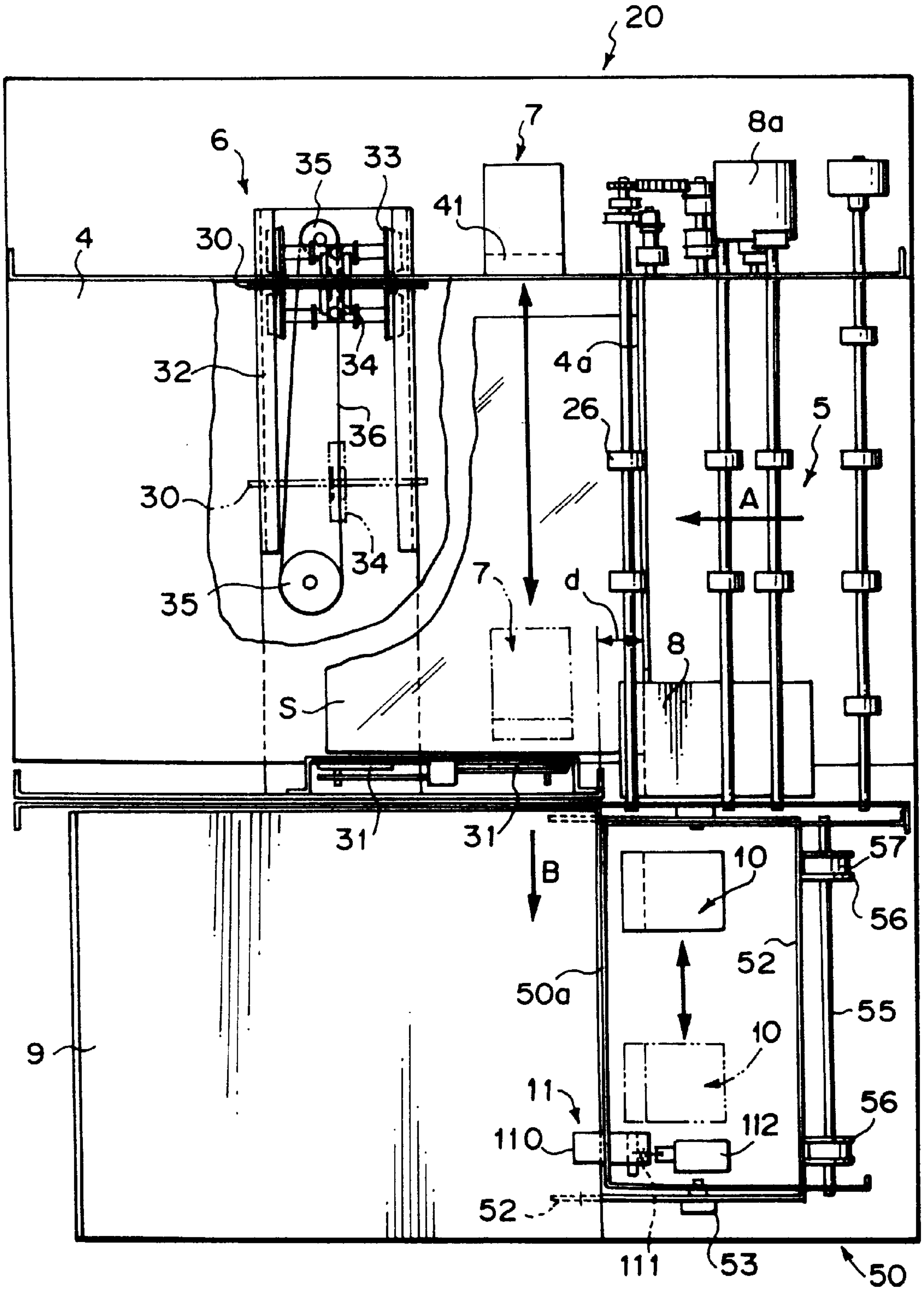
FIG. 5 is a horizontal cross-sectional view showing the sheet handling apparatus and the accumulation handling apparatus.

As shown in FIGS. 5 and 6, the second accumulation tray 4 is supported on the housing of the accumulation handling apparatus 50 to be movable up and down. A vertical wall surface **50*a* of the housing of the accumulation handling apparatus 50 functions as a reference surface for lining up the rear edges of the sheet stacks S'. As shown in FIG. 5, the reference surface (the vertical wall surface 50*a*) of the second accumulation tray 9 is shifted relative to the reference surface 4*a* of the handling tray 4** by a distance d in the direction A of discharge.

Figure 4:
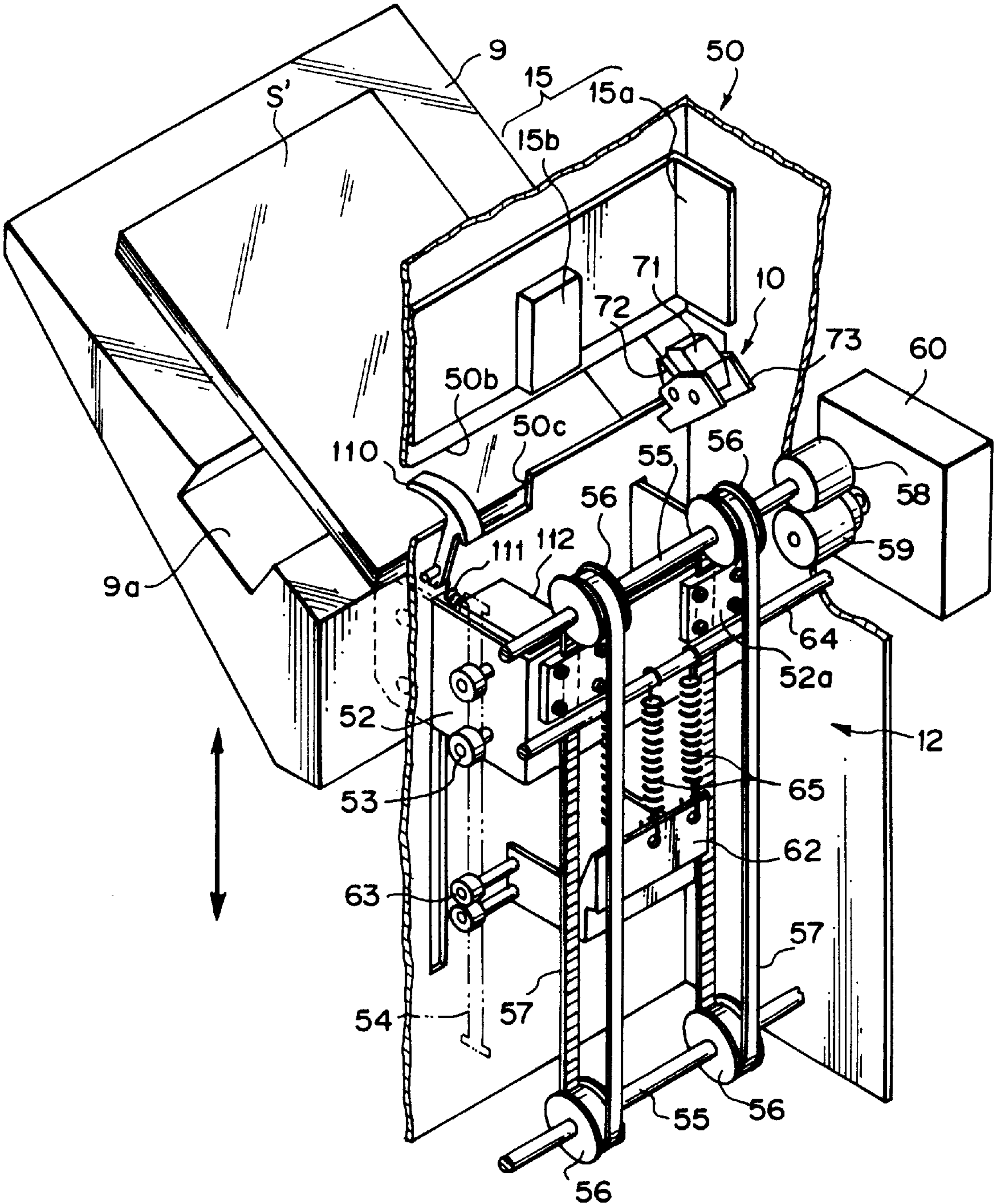
FIG. 4 is a perspective view partly cut away showing the structure of the accumulation handling apparatus.

As shown in FIG. 4, the second accumulation tray 9 is fixed to end portions of an up-and-down frame 52 projecting outward from the housing of the accumulation handling apparatus 50 at the accumulation handling apparatus side end portion thereof. The up-and-down frame 52 is provided with a pair of rollers 53 on each side thereof, and the rollers 53 are movable along vertical salts 54 formed in an inner wall of the housing.

Upper and lower shafts 55 extends horizontally along the end of the second accumulation tray 9, and left and right pulleys 56 are fixed to each shaft 55. Belts 57 are passed respectively around the left upper and lower pulleys and the right upper and lower pulleys. A driven gear 58 is fixed to an end of the upper shaft 55 and is in mesh with a drive gear 59 fixed to the output shaft of an accumulation tray motor 60 so that the upper pulleys 56 are driven by the motor 60. The up-and-down frame 52 is fixed to the belts 57 by way of fasteners 52a, whereby the up-and-down frame 52 and the second accumulation tray 9 are moved up and down when the belts 57 are run.

An auxiliary up-and-down frame 62 is supported for up-and-down movement along the vertical slots 54 by way of a pair of rollers 63 which are fixed to each side of the auxiliary up-and-down frame 62 and in engagement with each vertical slot 54. The auxiliary up-and-down frame 62 is suspended by a pair of springs 65 from a shaft 64 fixed above the auxiliary up-and-down frame 62. As the number of sheet stacks S' on the second accumulation tray 9 increases and the second accumulation tray 9 is moved downward, the lower end of the up-and-down frame 52 comes to abut against the auxiliary up-and-down frame 62. Thereafter the auxiliary up-and-down frame 62 is moved downward together with the up-and-down frame 52 overcoming the force of the springs 65. The springs 65 assists the accumulation tray motor 60 in supporting the weight of the sheet stacks S' on the second accumulation tray 9, thereby preventing an excessive load from acting on the motor 60.

Figure 7:
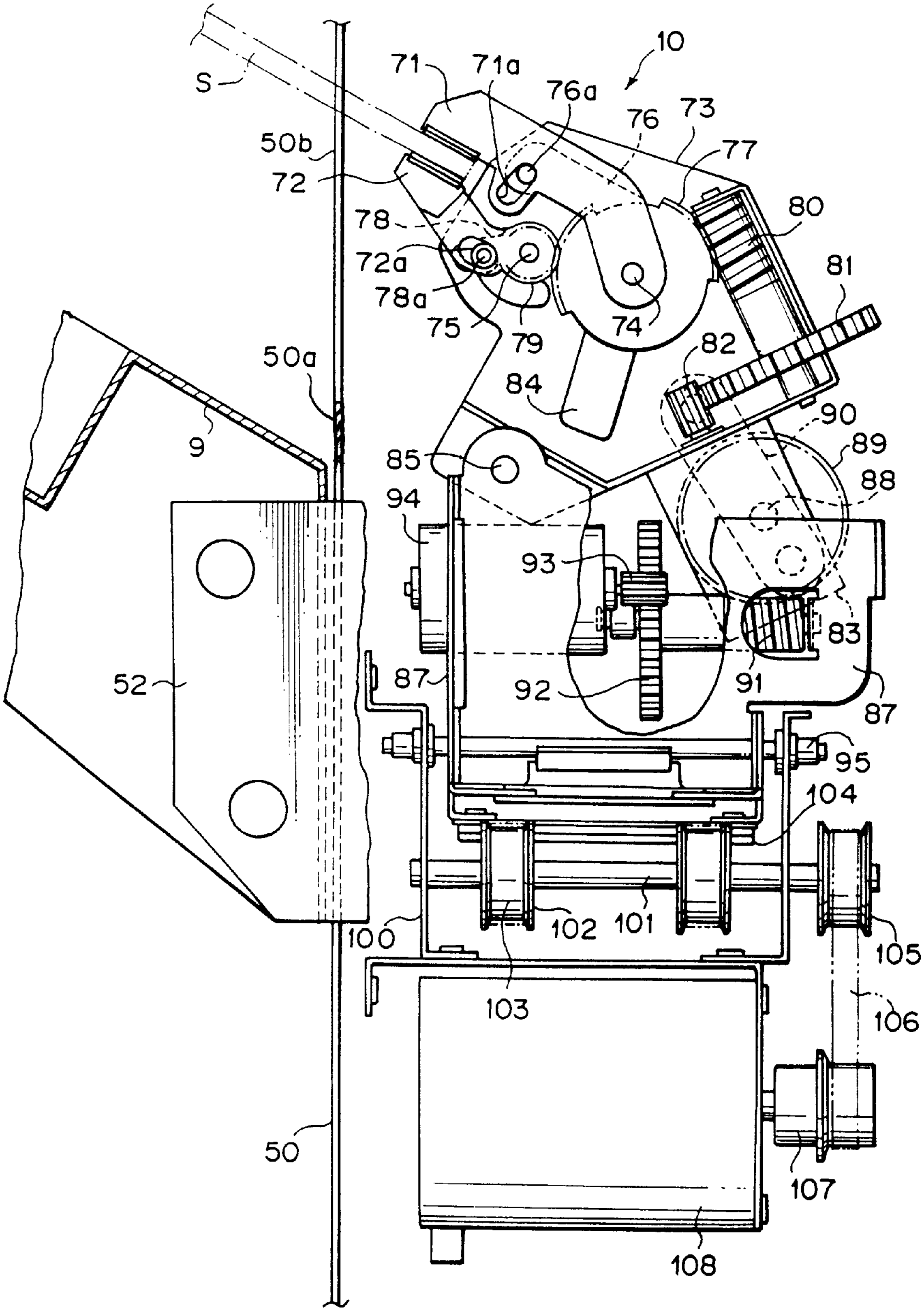
FIG. 7 is an enlarged fragmentary cross-sectional view showing an important part of the second gripper in an initial state.
Figure 8:
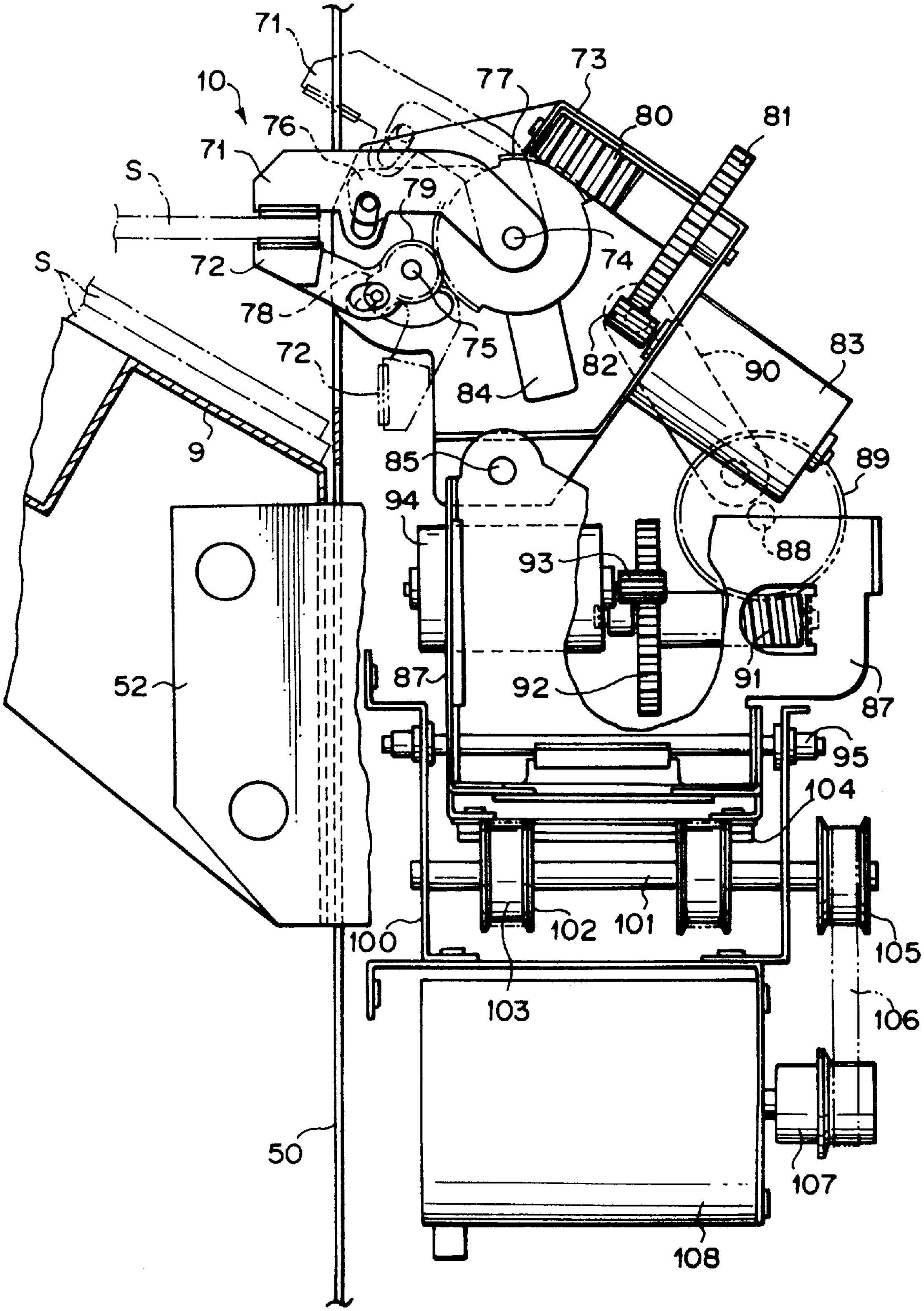
FIG. 8 is an enlarged fragmentary cross-sectional view showing the important part of the second gripper in a state where it is about to release the sheet stack.

As shown in FIGS. 7 and 8, the second gripper 10 receives the sheet stack S' which is gripped by the first gripper 7 and ejected from the handling tray 4 to the second accumulation tray 9. The second gripper 10 comprises upper and lower pinch levers 71 and 72 which respectively press the upper and lower surfaces of the sheet stack S' in surface contact therewith, thereby gripping therebetween the sheet stack S', an opening and closing mechanism which opens and closes the pinch levers 71 and 72 to release and grip the sheet stack S', and a transfer mechanism which transfers the pinch levers 71 and 72, accordingly the sheet stack S', in the direction of arrow B perpendicular to the direction A of discharge. The pinch levers 71 and 72 grip the sheet stack S' in an inclined state and are rotated to rotate the sheet stack S' into a horizontal position and at the same time move the sheet stack S' toward the second accumulation tray 9 by a small distance.

Specifically, the upper pinch lever 71 is supported for rotation on a rotating frame 73 at its base end portion by a first pivot pin 74 and the lower pinch lever 72 is supported for rotation on the rotating frame 73 by a second pivot pin 75. A first lever 76 having a partial gear 77 on its base portion is supported for rotation on the first pivot pin 74. A pin **76*a* projecting from the free end portion of the first lever 76 is received in an elongated hole 71*a* formed in the upper pinch lever 71. A second lever 78 is supported for rotation on the second pivot pin 75 and a pin 78*a* projecting from the free end of the second lever 78 is received in an elongated hole 72*a* formed in the lower pinch lever 72. A gear portion 79 is formed on the base portion of the second lever 78 and in mesh with the partial gear 77 of the first lever 76, whereby the upper and lower pinch levers 71 and 72 are opened and closed in response to rotation of the first and second levers 76 and 78**.

The partial gear 77 of the first lever 76 is also in mesh with a pinion gear 80 supported on the rotating frame 73. An intermediate gear 81 which is rotated integrally with the pinion gear 80 is in mesh with a drive gear 82 of an opening and closing motor 83, which is mounted on the rotating frame 73. Thus the upper and lower pinch levers 71 and 72 are opened and closed driven by the motor 83. The state of opening or closing of the pinch levers 71 and 72 is detected by a sensor (not shown) which detects the position of an action piece 84 which is rotated integrally with the upper pinch lever 71.

The diameter of the partial gear 77 of the first lever 76 is larger than that of the gear portion 79 of the second lever 78 and accordingly the angle by which the upper pinch lever 71 is rotated upon opening the second gripper 10 differs from that of the second pinch lever 72. The upper pinch lever 71 is opened by about 30° whereas the lower pinch lever 72 is opened downward by about 90° (FIG. 8)

The rotating frame 73 is supported for rotation on a movable frame 87 by a pivot pin 85 at its lower end portion. The movable frame 87 is provided with a shaft 88 extending in parallel to the pivot pin 85 and a rotating gear 89 is supported on the shaft 88. An off-centered position on the rotating gear 89 is connected to a rear end portion of the rotating frame 73 above the pivot pin 85 by a link 90 so that the rotating frame 73 is rotated between the retracted position shown in FIG. 7 and the projecting position shown in FIG. 8 by way of the link 90 in response to rotation of the rotating gear 89.

A pinion gear 91 which is supported for rotation to extend in perpendicular to the pivot pin 85 is in mesh with the rotating gear 89. An intermediate gear 92 which rotates integrally with the pinion gear 91 is in mesh with a drive gear 93 of the rotating motor 94, which mounted on the movable frame 87. Thus the rotating frame 73 is rotated driven by the rotating motor 94.

A pair of running members 95 which project on opposite sides of the movable frame 87 are engaged with guide grooves (not shown) formed on a guide frame 100 fixed to the housing of the accumulation handling apparatus 50, whereby the movable frame 87 is supported to be movable in the direction of arrow B.

A pair of pulleys 102 (one of them is shown in FIGS. 7 and 8) are supported for rotation on pulley shafts 101 spaced from each other in the transverse direction of the accumulation handling apparatus 50 inside the guide frame 100. A belt 103 is passed around the pulleys 102. The movable frame 87 is fixed to the belt 103 by a clamp 104. A driven pulley 105 is fixed to an end of one of the pulleys 102 and a drive belt 106 is passed around the driven pulley 105 and a drive pulley 107 fixed to the drive shaft of a transfer motor 108, which is mounted on the lower surface of the guide frame 100.

In response to rotation of the transfer motor 108 in the regular direction or the reverse direction, the movable frame 87 and the second gripper 10 are moved back or forth in the direction of arrow B. The home position of the second gripper 10 is a sheet receiving position beside the handling tray 4. The second gripper 10 is moved forward from the home position to a release position, where it releases the sheet stack S', by way of an intermediate position, where the sheet stack S' gripped by the second gripper 10 is bound by the stapler 8 and moved back from the release position to the home position by way of the intermediate position. In the home position and the release position, the second gripper 10 is opened and closed and is rotated in the release position.

The transfer mechanism for transferring the second gripper 10, the opening and closing mechanism for opening and closing the second gripper 10 and the rotating mechanism for rotating the second gripper 10 are disposed inside the housing of the accumulation handling apparatus 50 and the area over which the second gripper 10 is moved is covered with the housing. A horizontal slot **50*b* is formed in an upper portion of the housing and the second gripper 10 is moved along the slot 50*b* holding the sheet stack S'. In the release position, the upper and lower pinch levers 71 and 72 of the second gripper 10 are rotated and projected outside the housing through the slot 50*b***.

As shown in FIGS. 3 and 4, the sheet level detecting means 11 comprises a rotating sensor 110 which is provided with an arcuate end portion and is supported for rotation. The rotating sensor 110 is rotated by an actuator 112 by way of a spring 111. The leading end of the rotating sensor 110 is brought into contact with the upper surface of the sheet stack S' on the second accumulation tray 9 and the level of the upper surface of the sheet stacks S' on the second accumulation tray 9 is detected through the amount of rotation of the rotating sensor 110 by which the rotating sensor 110 is rotated before the leading end of the rotating sensor 110 is brought into contact with the upper surface of the sheet stack S'. The second accumulation tray 9 is moved up and down according to the level of the upper surface of the sheet stack S' thus detected.

The mechanisms are controlled by a control unit and the operator sets the number of sheets in one set, the number of sets, whether each set is to be stapled, the position of stapling and the like through a control panel of the control unit.

The shutter 15 is for preventing the sheet stack S' on the second accumulation tray 9 from interfering with the horizontal slot 50*b* due to inclination of the second accumulation tray 9 when the second accumulation tray 9 is moved upward. The shutter 15 comprises a shutter plate 15*a* which closes the horizontal slot 50*b* and a drive means 15*b* for moving up and down the shutter plate 15*a*.

Figure 13A:
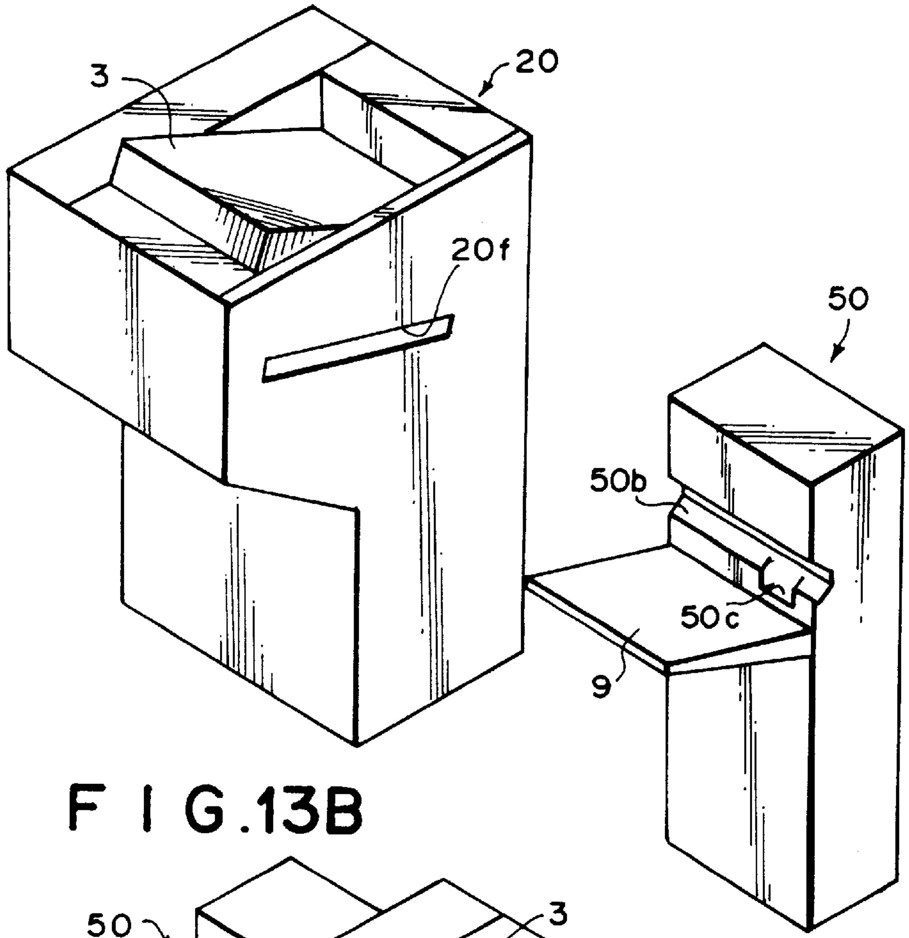
FIG. 13A is a perspective view showing the sheet handling apparatus and the accumulation handling apparatus separated from each other.
Figure 13B:
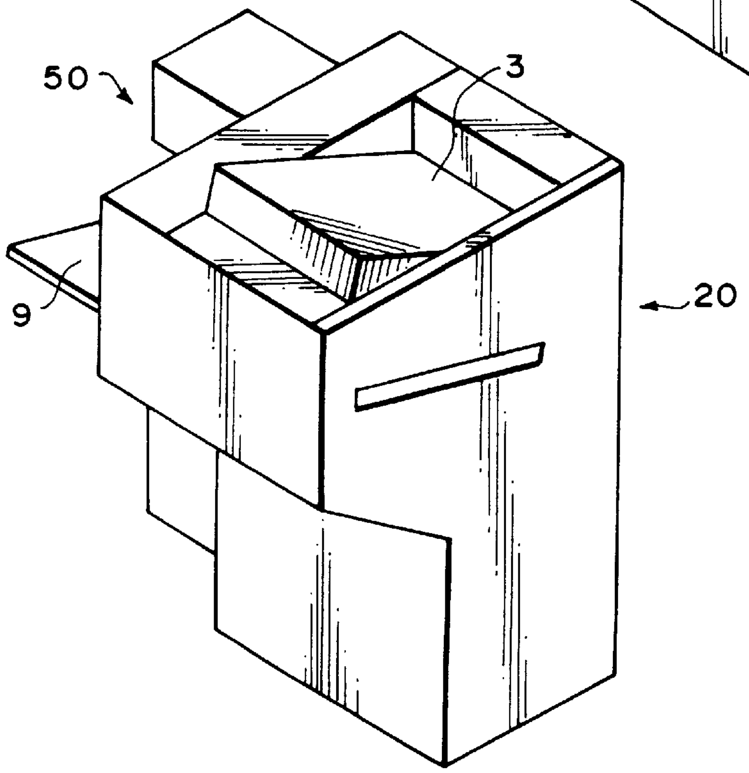
FIG. 13B is a perspective view showing the sheet handling apparatus and the accumulation handling apparatus combined with each other in a layout different from that of FIG. 1.

Though, in the layout shown in FIG. 1, the accumulation handling apparatus 50 is disposed on the right side of the sheet handling apparatus 20, the former may be disposed on the left side of the latter as shown in FIG. 13B. That is, that the layout of the apparatuses can be switched is very advantageous in the cases where there is possibility that the form of utilization is changed after the apparatuses are once installed, e.g., when the manner of accumulating the sheet stacks S' in the accumulation handling apparatus 50 is changed, when an additional post-handling apparatus such as for punching the sheet stacks S' is incorporated in the sheet handling system, or when the sheet stacks S' are to be handled by a multiple stages of trays which are movable both in horizontal and vertical directions or a belt conveyor in order to make it feasible to handle a great number of sheet stacks S' unlike in this embodiment, which is advantageous when 1000 to 2000 sheets are to be handled.

When the sheet handling apparatus 20 and the accumulation handling apparatus 50 are arranged to be separable and the movable parts of those apparatuses are arranged to be able to transfer the sheets or sheet stacks in either direction with the sheet delivery portions of these apparatuses arranged to be switched in a plurality of directions, the layout of the apparatuses can be more flexible so that the sheet handling apparatus 20 can be disposed on either of the control panel side of the copier 2 or one side of the same or a sheet handling apparatus which discharges the sheet stack S' in a direction reverse to that in the above embodiment can be employed.

Figure 14:
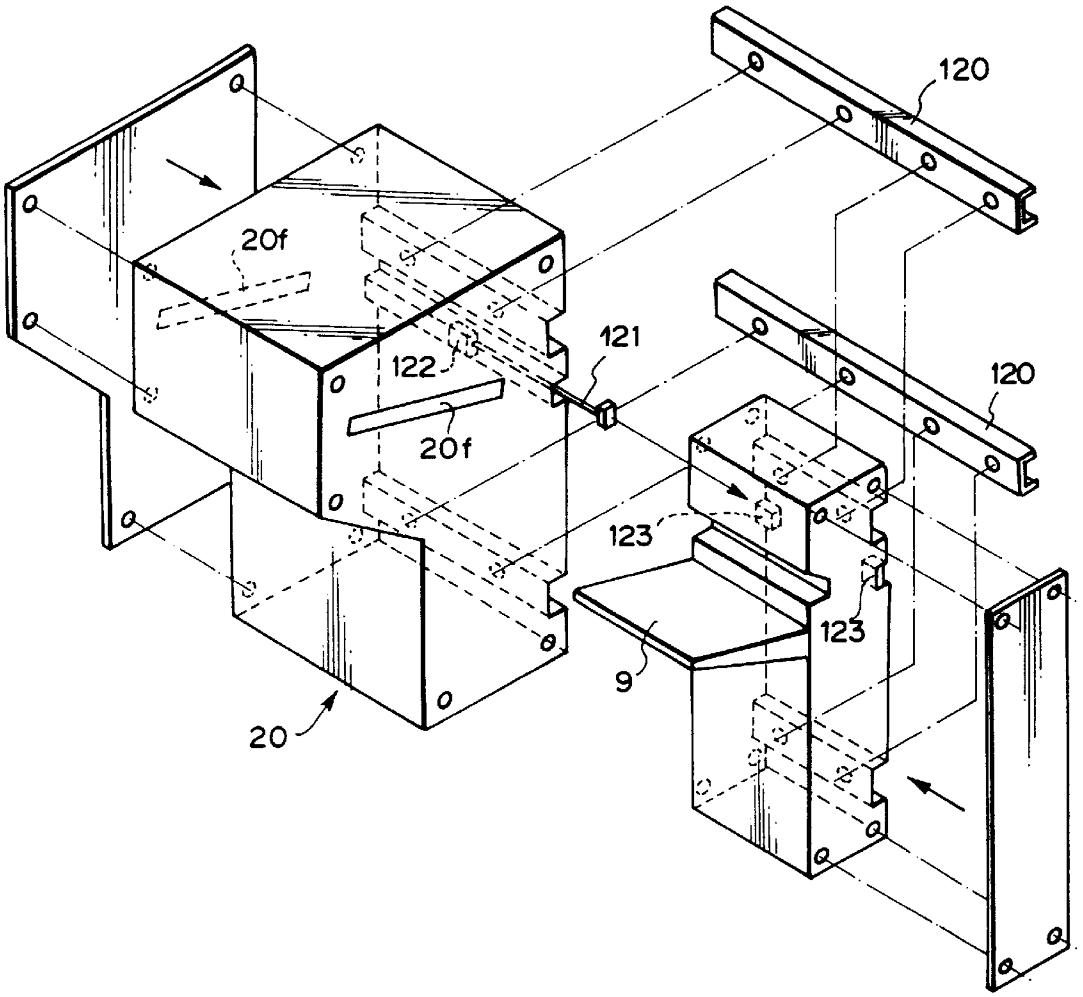
FIG. 14 is an exploded perspective view showing the sheet handling apparatus and the accumulation handling apparatus.

In FIG. 14, reference numeral 120 denotes a connecting shaft for connecting the sheet handling apparatus 20 and the accumulation handling apparatus 50, reference numeral 121 denotes a cable which electrically connects the sheet handling apparatus 20 and the accumulation handling apparatus 50, and reference numerals 122 and 123 are connectors for the cable 121.

As shown in FIG. 15, the aforesaid drive systems are controlled by a parallel I/O 152 on the basis of signals from a CPU 150 and a memory 151 such as a ROM or RAM.

The post handling step of the sheets S will be described with reference to FIGS. 16 to 19. In the flow chart shown in FIGS. 16 and 17 and the timing chart shown in FIG. 18, each pair of sheets S (the same sizes) are stacked into a sheet stack S', and then the sheet stacks S' are stapled and stacked on the second accumulation tray 9. In FIG. 18, Mi (i=1 to 19) represents the timing at which the corresponding part is operated or the period for which the corresponding part is operated.

Figure 16:
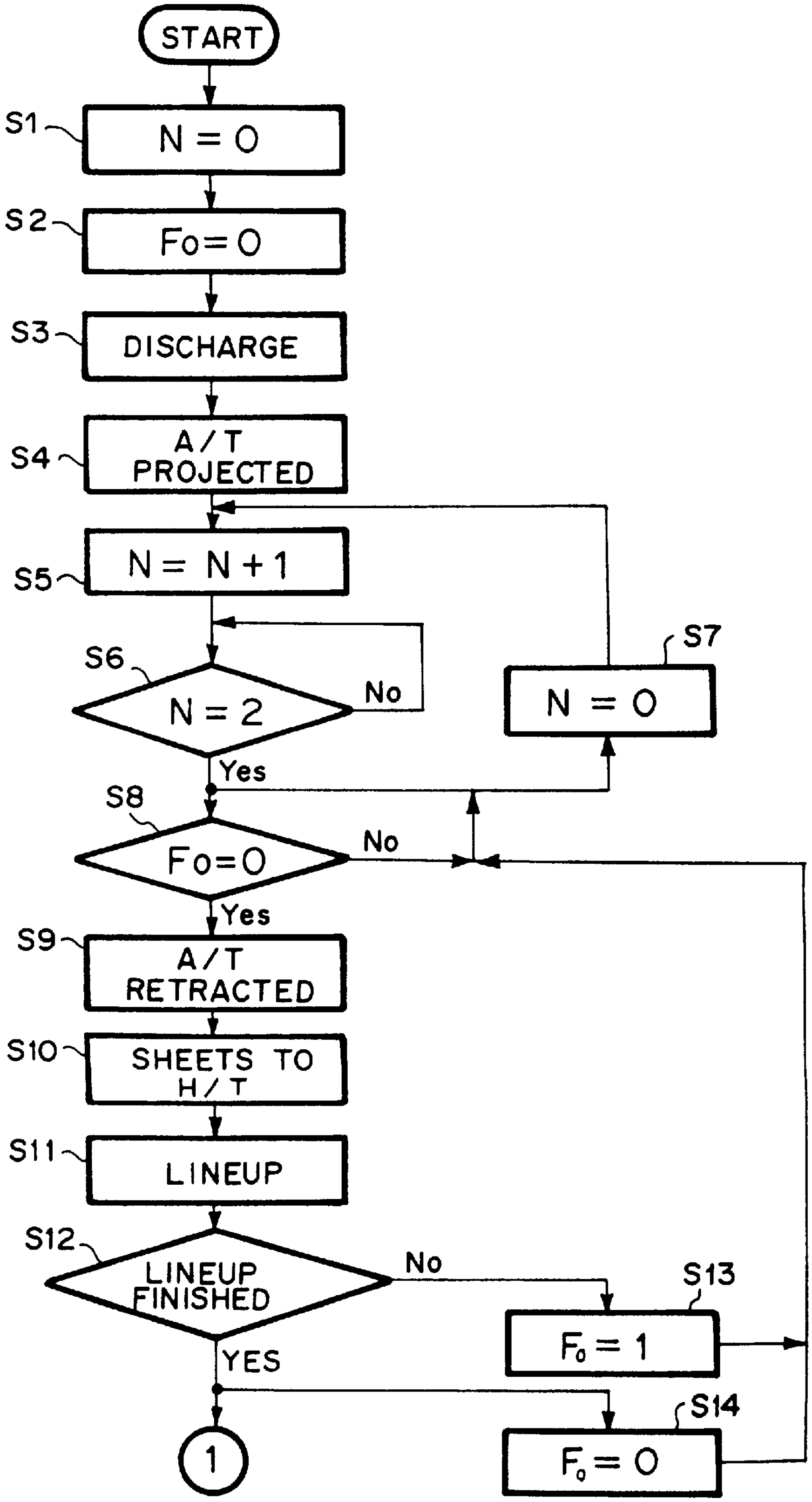
FIG. 16 is a flow chart for illustrating a first half of the operation of the sheet handling system.
Figure 17:
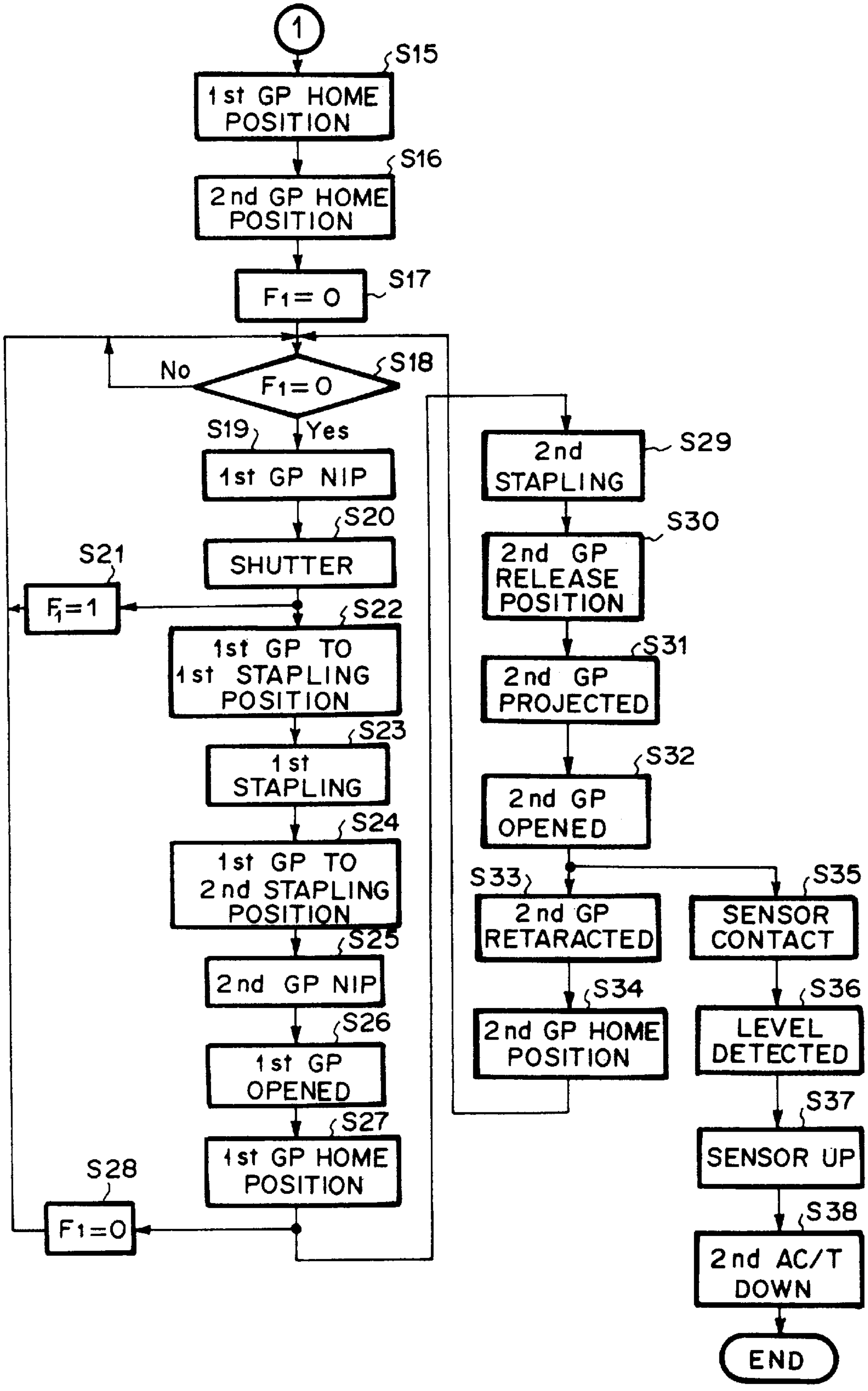
FIG. 17 is a flow chart for illustrating a second half of the operation of the sheet handling system.
Figure 18:
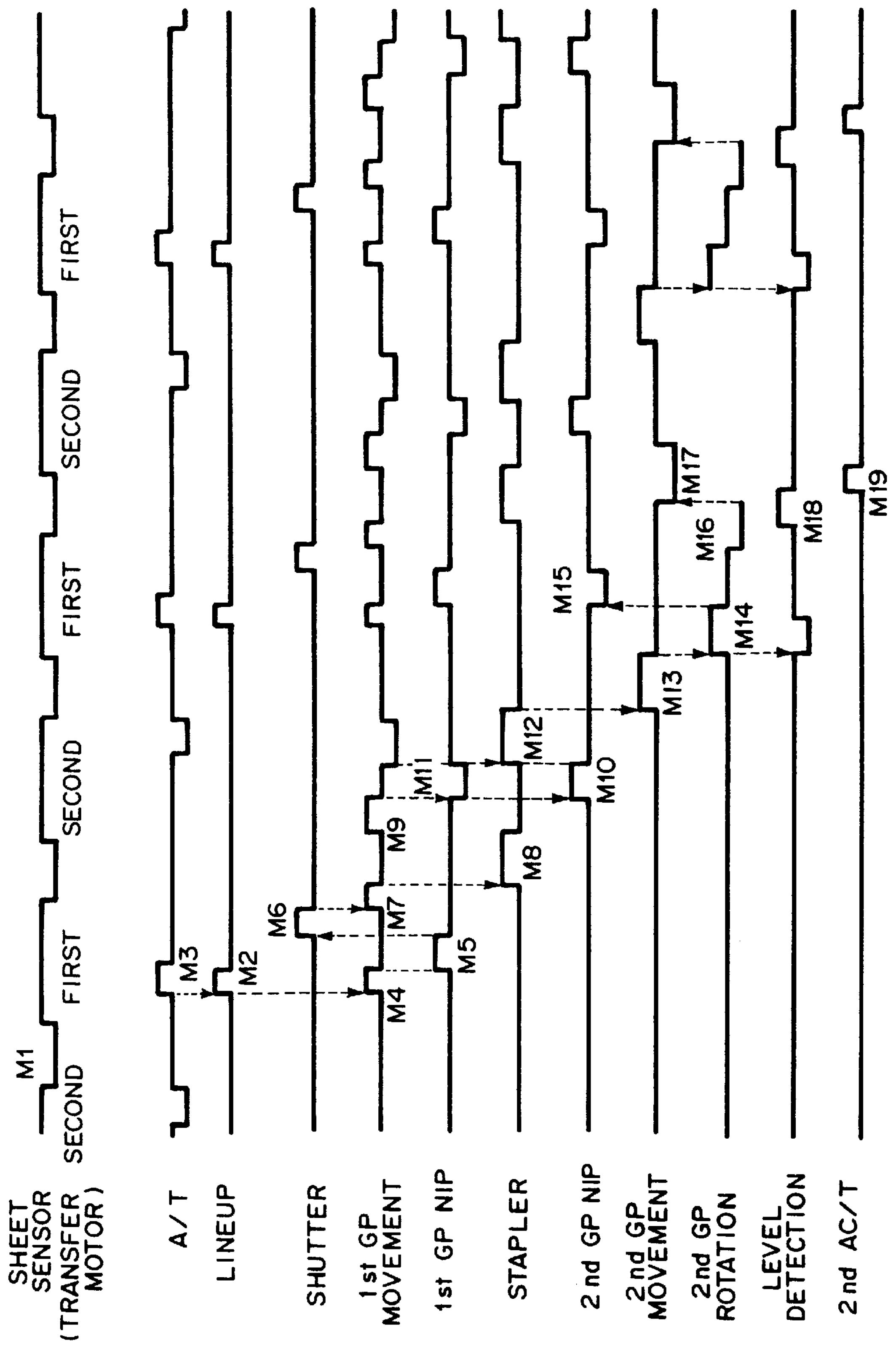
FIG. 18 is a timing chart for illustrating the operation of the sheet handling system.

In the flow chart shown in FIGS. 16 and 17, the number N of the recording sheets which has been discharged from the copier 2 is set 0 and a sheet lineup flag Fo is set to 0 (representing that the preceding sheet stack has been lined up) as an initialization. (steps S1 and S2) The recording sheets S are discharged from the copier 2 one by one. (step S3) At this time the auxiliary tray 13 is projected and the sheets S are transferred onto the auxiliary tray 13, N is incremented one by one and a pair of sheets S are stacked on the auxiliary tray 13. (steps S4, S5 and S6) When a pair of sheets S are stacked on the auxiliary tray (A/T) 13, N is reset to 0 and at the same time it is determined whether the sheet lineup flag Fo is 0. (steps S7 and S8) When it is determined that the sheet lineup flag Fo is 0, that is, the preceding sheets S have been lined up, the auxiliary tray 13 is retracted to permit the sheets S to fall onto the handling tray (H/T) 4. (steps S9 and S10) When the sheets S fall onto the handling tray 4, the sheets slide rearward by virtue of the inclination of the handling tray 4 and their rear edges are brought into abutment against the reference surface 4*a* of the handling tray 4, whereby the sheets S are lined up in the direction of discharge. M1 in FIG. 18 represents operation of the sheet sensor and the transfer motor (not shown). Thereafter the lineup member 30 pushes one side edges of the sheets S to press the other edges of the sheets S against the reference plate 31, whereby lineup of the sheets S in the direction perpendicular to the direction of discharge is effected. (step S11) The auxiliary tray 13 is projected (M3) when a next series of (pair of) sheets S are discharged while the preceding series of sheets S are in the lineup step, thereby supporting the sheets S of the next series and separating the next series of sheets S from the preceding series of sheets S. (steps S11 to S14)

Figure 19A:
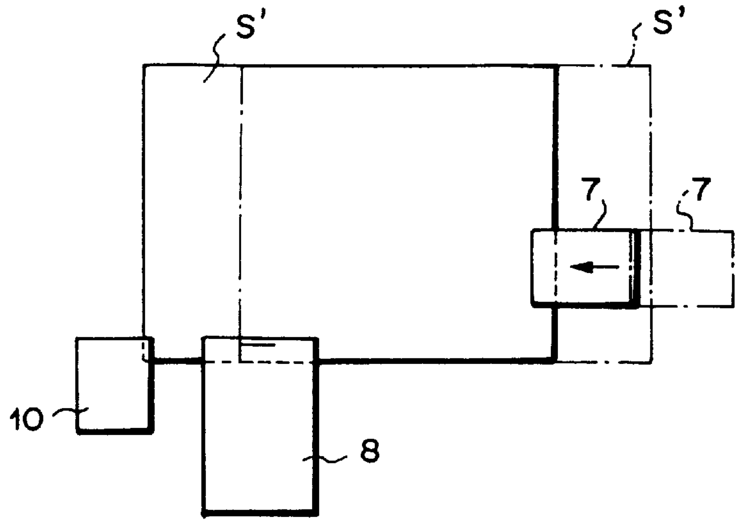
FIGS. 19A to 19C are schematic views for illustrating, by time series, the procedure of transferring the sheet stack from the handling tray to the second accumulation tray.
Figure 19B:
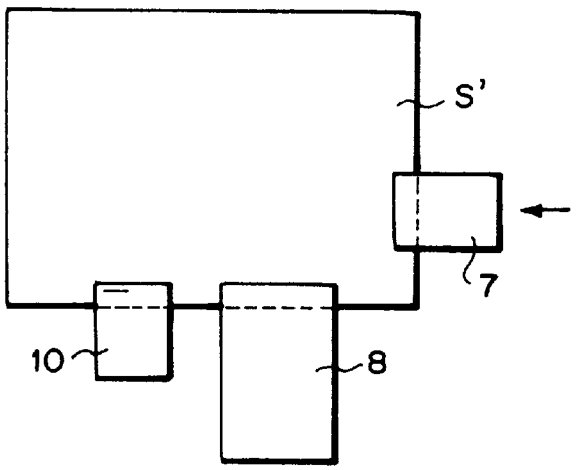
Figure 19C:
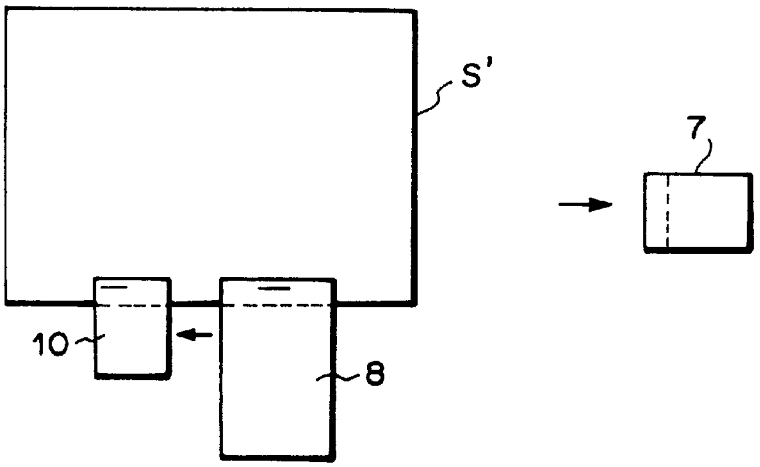

FIGS. 19A to 19C show in sequence the procedure of transferring the sheet stack S' from the first gripper 7 to the second gripper 10 during transfer of the sheet stack S' from the handling tray 4 (disposed on the left side of the FIGS. 19A to 19C) to the second accumulation tray 9. During the procedure shown in FIGS. 19A to 19C, the second gripper 10 and the stapler 8 are kept stationary.

After lineup is finished, the first gripper (1st GP) 7 is moved to its home position shown by the solid line in FIG. 5. (step S15, M4) At this time, the second gripper (2nd GP) 10 is in its home position shown by the solid line in FIG. 5. (step S16) Here a transfer flag F1 representing whether a sheet stack S' is being transferred is set to 0 (representing that a sheet stack S' is not being transferred). (step S17) Then the first gripper 7 is caused to nip the rear edge portion of the sheet stack S' which has been lined up. (steps S18 and S19, M5, the chained line in FIG. 19A)

Then the reference plate (shutter) 31 is moved upward (step S20, M6) to permit the sheet stack S' to move in the direction B of transfer, transfer of another sheet stack S' is waited for (F1=1, step S21), the first gripper 7 is moved toward the second accumulation tray 9 by a predetermined distance in the direction B of transfer, which intersects the direction A of discharge, to bring a first stapling position on the sheet stack S' to the stapler 8 (step S22, M7, the solid line in FIG. 19A). Then the stapler 8 is operated to bind the sheet stack S' in the first stapling position. (step S23, M8) The reference plate 31 is moved downward just after the sheet stack S' is inserted below the reference plate 31 and presses downward the sheet stack S' lightly to permit passage of the sheet stack S'.

Then the first gripper 7 is moved forward to bring a second stapling position on the sheet stack S' to the stapler 8 (step S24, M9, FIG. 19B, the solid line in FIG. 1). At this time, the second gripper (2nd GP) 10 is in its home position beside the handling tray 4 (the solid line in FIGS. 5 and 6) and in the retracted position shown in FIG. 7. When the first gripper 7 is stopped, the second gripper 10 nips the sheet stack S' at the side on the reference surface in the position. (step S25, M10)

After the second gripper 10 nips the sheet stack S', the first gripper 7 is opened to release the sheet stack S' (step S26, M11, FIG. 19C) and is moved to the home position shown by the solid line in FIG. 2 (step S27). Then the transfer flag F1 is reset to 0, thereby permitting transfer of another sheet stack S'. (step S28) Then the stapler 8 is operated to bind the sheet stack S' in the second stapling position. (step S29, M12) The staple positions are set by the operator as the amounts of transfer by the first gripper 7.

Thereafter the second gripper 10 is moved to the release position shown by the chained line in FIGS. 5 and 6 and stopped there. (step S30, M13) In the release position, the second gripper 10 is rotated from the retracted position shown in FIG. 7 to the projecting position shown in FIG. 8, whereby the sheet stack S' held by the second gripper 10 comes to be held horizontally and is moved in a direction perpendicular to the direction B of transfer. (step S31, M14)

That is, the second gripper 10 transfers the sheet stack S' to the release position in such a manner that the rear edge of the sheet stack S' is slid along the reference surface 4*a* of the handling tray 4 which is retracted from the reference surface 50*a* of the second accumulation tray 9 as shown in FIG. 7. When the second gripper 10 is rotated to the projecting position shown in FIG. 8, the rear edge of the sheet stack S' comes to be substantially aligned with the reference surface 50*a* of the second accumulation tray 9. BY the rotation of the second gripper 10, the rear edge of the sheet stack S' comes to be held horizontally. (M14) In the release position, the upper and lower pinch levers 71 and 72 of the second gripper 10 are opened as shown by the chained line in FIG. 8 and the sheet stack S' is caused to fall on the second accumulation tray 9 or the preceding sheet stacks S'. (step S32, M15)

The sheet stack S' dropped from the second gripper 10 is stacked on the preceding sheet stack S' on the second accumulation tray 9 without the rear edge thereof largely shifted from the rear edge of the preceding sheet stacks S' and without the rear edge thereof engaged with the stapler on the preceding sheet stack S'.

With the second gripper 10 held open, the rotating frame 73 is rotated back to return the second gripper 10 to the retracted position (step S33, M16), and the second gripper 10 is moved back to the home position (step S34, M17) At this time, even if another sheet stack S' is being transfered, the sheet stack S' does not interfere with the second gripper 10 since the upper and lower pinch levers 71 and 72 of the second gripper 10 are held open. Thus the second gripper 10 is returned to the home position and waits for gripping of another sheet stack S'.

In response to rotation of the second gripper 10 to the horizontal position (M14), the actuator 112 of the sheet level detecting means 11 rotates the rotating sensor 110 to bring it into contact with the upper surface of the sheet stack S' on the second accumulation tray (2nd AC/T) 9 and the level of the sheet stacks S' on the second accumulation tray 9 is detected. (steps S35 and S36) Thereafter the actuator 112 rotates the rotating sensor 110 upward away from the sheet stack S'. (step S37, M18) When the sheet level is higher than a predetermined level, the second accumulation tray 9 is lowered to the predetermined level by the lift means 12. (step S38, M19) When the sheet stack S' on the second accumulation tray 9 is removed therefrom by the operator, the second accumulation tray 9 is moved upward in response to detection thereof.

Since the second gripper 10 is moved inside the housing when it transfers the sheet stack S', the second gripper 10 and its transfer mechanism cannot interfere with the operator who is removing the sheet stacks S' on the second accumulation tray 9. Further since the sheet stack S' is transferred gripped by the second griper 10, the sheet stack S' is kept lined up during transfer.

Though in the embodiment described above each of the first and second grippers 7 and 10 comprises a pair of pinch levers which presses the sheet stack S' in surface contact therewith, each gripper may comprise other members such as rollers. The drive mechanisms or the actuators for the respective parts may be variously modified.

When the rear edge of the second accumulation tray 9 is shifted forward from the rear edge of the handling tray 4, the second gripper 10 and its transfer mechanism can be enclosed in the housing during transfer of the sheet stack S', which ensures safety.

Further though, in the embodiment described, a copier 2 is employed as the image recording means, the copier 2 may be either of a digital system or an analogue system and other image forming (recording) means such as a printer (including a laser printer), a facsimile and the like may be employed in place of the copier 2.

What is claimed is:

1. A sheet handling apparatus which receives a plurality of sheets discharged by a discharge means from an image recording apparatus comprising: a first support member disposed below the discharge means to form a stack of the sheets on the first support member and carries out handling on the stack of sheets:

a second support member which is supported to be movable back and forth between a projecting position where the second support member is projected over the first support member and is able to support a rear end portion of a sheet discharged by the discharge means with a front end portion of the sheet supported by the first support member and a retracted position where the second support member is retracted from the first support member, and a control means which controls movement of the second support member.

2. A sheet handling apparatus as defined in claim 1 in which the second support member is moved back and forth between the projecting position and the retracted position in a direction parallel to the sheet receiving surface of the first support member.

3. A sheet handling apparatus as defined in claim 1 in which the second support member is provided with a sheet returning means for conveying the sheet discharged onto the second support member in a direction opposite to the direction of discharge by the discharge means.

4. A sheet handling apparatus as defined in claim 3 in which the discharge means comprises a rotating member disposed to be brought into contact with the sheet on the second support member and the rotating member doubles as the sheet returning means.

5. A sheet handling apparatus as defined in claim 1 in which the control means moves the second support member to the projecting position before initiation of receipt of a plurality of sheets and returns the second support member after at least a part of the sheet which is discharged earliest in the sheets comes to be supported by the second support member.

6. A sheet handling apparatus as defined in claim 1 in which the control means moves the second support member to the projecting position after a series of sheets to be handled together are received by the first support member and before a following sheet is received by the first support member so that the following sheet is supported by the second support member.

7. A sheet handling apparatus as defined in claim 1 in which the control means moves the second support member back and forth between the projecting position and the retracted position each time a predetermined number of sheets are discharged in such a manner that the second support member is moved to the projecting position before at least a part of the sheet which is discharged earliest in the predetermined number of sheets is brought into contact with the upper surface on the first support member or the preceding sheet on the first support member and is returned to the retracted position after at least a part of the sheet which is discharged earliest in the predetermined number of sheets comes to be supported by the second support member to permit the sheet on the second support member to move to the first support member.

8. A sheet handling apparatus as defined in claim 1 in which the control means moves the second support member back and forth between the projecting position and the retracted position each time a predetermined number of sheets are discharged in such a manner that the second support member is moved to the projecting position before at least a part of the sheet which is discharged earliest in the predetermined number of sheets is brought into contact with the upper surface of the first support member or the preceding sheet on the first support member and is returned to the retracted position after at least a part of the sheet which is discharged last in the predetermined number of sheets comes to be supported by the second support member to permit the sheet on the second support member to move to the first support member.

9. A sheet handling apparatus as defined in claim 1 in which the control means moves the second support member to the projecting position after a sheet stack on the first support member is removed from the first support member.

10. A sheet handling apparatus as defined in claim 1 further comprising a post handling means for post handling of a sheet stack on the first support member, a third support member on which sheet stacks handled by the post handling means are stacked and a transfer means which transfers each sheet stack handled by the post handling means to the third support member.

11. A sheet handling apparatus as defined in claim 10 in which the second support member in the projecting position is above the transfer path of the sheet stack by the transfer means.

12. A sheet handling apparatus as defined in claim 10 in which the control means moves the second support member to the projecting position after a series of sheets which are to be handled together are all received by the first support member and before a following sheet is received by the first support member so that the following sheet is supported on the second support member, and returns the second support member to the retracted position to permit the sheet on the second support member to fall on the first support member after transfer of said series of sheets from the first support member is initiated.

13. A sheet handling apparatus which receives a plurality of sheets discharged by a discharge means from an image recording apparatus on a first support member disposed below the discharge means to form a stack of the sheets on the first support member and carries out handling on the stack of sheets, wherein the improvement comprises

- a second support member which is supported to be movable back and forth between a projecting position where it is projected over the first support member and is able to support a rear end portion of a sheet discharged by the discharge means with a front end portion of the sheet supported by the first support member and a retracted position where it is retracted from the first support member,
- a sheet sensor which detects a sheet discharged by the discharge means, and
- a control means which controls movement of the second support member on the basis of result of detection of the sheet by the sheet sensor.

14. A sheet handling apparatus as defined in claim 13 in which the control means moves the second support member to the projecting position before a first predetermined time lapses after the sheet sensor detects the sheet which is discharged earliest in a predetermined number of sheets.

15. A sheet handling apparatus as defined in claim 14 in which the control means moves the second support member to the retracted position after a second predetermined time lapses from the time the sheet sensor detects the sheet which is discharged earliest in the predetermined number of sheets.

16. A sheet handling apparatus as defined in claim 13 in which the control means moves the second support member to the projecting position before initiation of receipt of a predetermined number of sheets and may move the second support member to the retracted position after a predetermined time lapses from the time the sheet sensor detects the sheet which is discharged earliest in the predetermined number of sheets.

17. A sheet handling apparatus as defined in claim 13 in which the control means changes the timing at which it moves the second support member to the retracted position according to the size of the sheet on the basis of sheet size information output from the image recording means.

18. A sheet handling apparatus as defined in claim 17 in which the control means moves the second support member to the retracted position earlier as the dimension of the sheet to be discharged as measured in the direction of discharge of the sheets by said discharge means increases.

19. A sheet handling apparatus which receives a plurality of sheets discharged by a discharge means from an image recording apparatus on a first support member disposed below the discharge means to form a stack of the sheets on the first support member and carries out handling on the stack of sheets, wherein the improvement comprises

- a second support member which is supported to be movable back and forth between a projecting position where it is projected over the first support member and a retracted position where it is retracted from the first support member, and
- a control means which controls movement of the second support member,
- the second support member being smaller than the first support member in the dimension as measured in the direction of discharge of the sheets by said discharge means so that in the projecting position, the second support member supports the sheet by itself when the dimension of the sheet as measured in the direction of discharge of the sheets by said discharge means is relatively small and supports the sheet associating with at least a part of the first support member when the dimension of the sheet as measured in the direction of discharge of the sheets by said discharge means is relatively large.

* * * * *